(12) United States Patent
Baldemair et al.

(10) Patent No.: US 9,917,616 B2
(45) Date of Patent: Mar. 13, 2018

(54) SYNCHRONIZATION SIGNAL DESIGN FOR WIRELESS DEVICES IN A LONG RANGE EXTENSION MODE

(71) Applicant: Telefonaktiebolaget L M Ericsson (publ), Stockholm (SE)

(72) Inventors: Robert Baldemair, Solna (SE); Johan Bergman, Stockholm (SE); Konstantinos Dimou, Stockholm (SE); Pål Frenger, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 535 days.

(21) Appl. No.: 14/156,730

(22) Filed: Jan. 16, 2014

(65) Prior Publication Data
US 2014/0198772 A1 Jul. 17, 2014

Related U.S. Application Data

(60) Provisional application No. 61/753,703, filed on Jan. 17, 2013.

(51) Int. Cl.
*H04B 1/7073* (2011.01)
*H04W 56/00* (2009.01)
(Continued)

(52) U.S. Cl.
CPC ....... *H04B 1/7073* (2013.01); *H04L 27/2655* (2013.01); *H04L 27/2692* (2013.01);
(Continued)

(58) Field of Classification Search
CPC ............ H04L 27/2665; H04L 27/2656; H04L 27/2655; H04L 27/2657; H04L 27/2613;
(Continued)

(56) References Cited

U.S. PATENT DOCUMENTS

| 2005/0157683 A1* | 7/2005 | Ylitalo | H04B 7/0634 370/334 |
| 2006/0073801 A1* | 4/2006 | Wang | H04B 7/0857 455/226.1 |

(Continued)

OTHER PUBLICATIONS

Author Unknown, "3rd Generation Partnership Project; Technical Specification Group Services and System Aspects; Service requirements for Machine-Type Communications (MTC); Stage 1 (Release 11)," Technical Specification 22.368, Version 11.6.0, Sep. 2012, 3GPP Organizational Partners, 21 pages.
(Continued)

*Primary Examiner* — Michael Thier
*Assistant Examiner* — Rownak Islam
(74) *Attorney, Agent, or Firm* — Withrow & Terranova, PLLC

(57) ABSTRACT

Systems and methods related to a synchronization signal particularly well suited for wireless devices in an extended coverage area of a cell of a cellular communications network are disclosed. In one embodiment, a base station transmits a synchronization signal including multiple repetitions of a basic synchronization block during a coherence time of a downlink channel over which the synchronization signal is transmitted. The multiple repetitions of the basic synchronization block during the coherence time enable coherent combining during detection of the synchronization signal at wireless devices located in the cellular communications network. This coherent combining enables, for example, wireless devices located in an extended coverage area of a cell served by the base station to synchronize to the cell using a shorter synchronization signal than that which would be required if only non-coherent combining were used.

59 Claims, 18 Drawing Sheets

(51) Int. Cl.
*H04L 27/26* (2006.01)
*H04L 5/00* (2006.01)
(52) U.S. Cl.
CPC ....... *H04W 56/00* (2013.01); *H04W 56/0015* (2013.01); *H04L 5/0048* (2013.01); *H04W 56/001* (2013.01)
(58) Field of Classification Search
CPC ............... H04L 27/2692; H04L 5/0048; H04L 27/2695; H04B 1/707; H04B 1/70735; H04B 1/7073; H04B 1/7183; H04B 1/7156; H04B 27/2655; H04B 27/2692; H04B 5/0048; H04W 56/00; H04W 56/001; H04W 56/0015; H04W 56/0085
USPC .................................................. 370/229, 335
See application file for complete search history.

(56) References Cited

U.S. PATENT DOCUMENTS

| | | | | |
|---|---|---|---|---|
| 2008/0291945 | A1* | 11/2008 | Luo | H04J 11/0069 370/509 |
| 2011/0032149 | A1* | 2/2011 | Leabman | H01Q 1/246 342/368 |
| 2011/0190027 | A1* | 8/2011 | Michel | H04W 24/02 455/522 |
| 2013/0235851 | A1* | 9/2013 | Abu-Surra | H04W 56/00 370/336 |
| 2013/0294333 | A1* | 11/2013 | Chen | H04L 5/0048 370/328 |
| 2013/0301491 | A1* | 11/2013 | Bashar | H04W 76/048 370/280 |
| 2014/0094127 | A1 | 4/2014 | Dimou et al. | |
| 2014/0169326 | A1* | 6/2014 | Levanen | H04W 56/00 370/330 |
| 2014/0185465 | A1 | 7/2014 | Balachandran et al. | |
| 2015/0311994 | A1* | 10/2015 | Thiele | H04B 7/0417 370/329 |
| 2016/0029329 | A1* | 1/2016 | Dabak | H04W 56/001 370/350 |

OTHER PUBLICATIONS

Author Unknown, "3rd Generation Partnership Project; Technical Specification Group Radio Access Network; Evolved Universal Terrestrial Radio Access (E-UTRA); Physical Channels and Modulation (Release 11)," Technical Specification 36.211, Version 11.1.0, Dec. 2012, 3GPP Organizational Partners, 108 pages.

Author Unknown, "3rd Generation Partnership Project; Technical Specification Group Radio Access Network; Evolved Universal Terrestrial Radio Access (E-UTRA); Physical layer procedures (Release 11)," Technical Specification 36.213, Version 11.1.0, Dec. 2012, 3GPP Organizational Partners, 160 pages.

Author Unknown, "3rd Generation Partnership Project; Technical Specification Group Radio Access Network; Study on provision of low-cost MTC UEs based on LTE; (Release 11)," Technical Specification 36.888, Version 2.0.0, Jun. 2012, 3GPP Organizational Partners, 43 pages.

Author Unknown, "Updated SID on: Provision of low-cost MTC Ues based on LTE," Vodafone, RP-121441, Agenda item 12.4.3, TSG RAN meeting #57, Sep. 4-7, 2012, Chicago, IL, 6 pages.

Author Unknown, "Discussion on Coverage Enhancement for a low-cost MTC UE," LG Electronics, R1-124993, Agenda item 6.3.3, TSG RAN1 meeting #71, Nov. 12-16, 2012, New Orleans, LA, 5 pages.

Author Unknown, "Coverage Extension for MTC UES," General Dynamics Broadband UK, R1-125204, Agenda Item 6.3.3, 3GPP TSG RAN1 meeting #71, Nov. 12-16, 2012, New Orleans, LA, 7 pages.

Yingming, Tsai et al., "Cell search in 3GPP long term evolution systems," IEEE Vehicular Technology Magazine, vol. 2, Issue 2, Jun. 2007, IEEE, pp. 23-29.

International Search Report and Written Opinion for International Application No. PCT/IB2014/058360, dated Jul. 7, 2014, 17 pages.

Official Action for Mexican Patent Application No. MX/a/2015/009208, dated Aug. 17, 2016, 8 pages.

* cited by examiner

SYNCHRONIZATION SIGNAL DESIGN FOR WIRELESS DEVICES IN A LONG RANGE EXTENSION MODE

RELATED APPLICATIONS

This application claims the benefit of provisional patent application Ser. No. 61/753,703, filed Jan. 17, 2013, the disclosure of which is hereby incorporated herein by reference in its entirety.

FIELD OF THE DISCLOSURE

The present disclosure relates to a cellular communications network and, in particular, to a synchronization signal for a cellular communications network.

BACKGROUND

There is an increasing need to support efficient and cost-effective devices, or terminals, in a cellular communications network. This is especially true with the increasing interest in and development of Machine-to-Machine (M2M) communication. In the 3rd Generation Partnership Project (3GPP) standards, unlike traditional services such as voice and web streaming, M2M services often have very different requirements on the cellular communications network due to specific features of M2M services specified in 3GPP Technical Specification (TS) 22.368 V11.6.0, "Service requirements for Machine-Type Communications (MTC); Stage 1." Another distinguishing characteristic in a cellular communications network with M2M communication is the large increase in the number of Machine Type Communication (MTC) devices. Both the different requirements of M2M services and the large number of MTC devices bring forth new challenges to develop a cost, spectrum, and energy efficient radio access technology for M2M applications and MTC devices in a cellular communications network.

In M2M communications, the MTC devices (e.g., smart meters, signboards, cameras, remote sensors, laptops, and appliances) are connected to the cellular communications network. Most of the MTC devices sporadically transmit one or only a few short packets containing measurements, reports, and triggers, e.g., temperature, humidity, wind speed, etc. In most cases, the MTC devices are expected to be static or to have low mobility. A common understanding of MTC devices is that the MTC devices should be of low complexity targeting low-end (low average revenue per user, low data rate, high latency tolerance) applications. The power/energy consumption of the MTC devices is expected to be low as well.

Several factors affect the cost for both manufacturing and operating a given wireless device. The main manufacturing cost drivers are: (1) processing speed (mainly at reception), (2) number of antennas, and (3) bandwidth. Therefore, 3GPP Radio Access Network (RAN) Work Group 1 (i.e., RAN1) has studied Long Term Evolution (LTE) User Equipment (UE) modem cost reduction techniques for provisioning of low-cost MTC UEs based on LTE. The results of the study are documented in 3GPP Technical Report (TR) 36.888 V2.0.0 (3GPP Tdoc RP-120714), "Study on provision of low-cost Machine-Type Communications (MTC) User Equipments (UEs) based on LTE." Since then, an updated Study Item Description (SID) (3GPP Tdoc RP-121441, "Study on Provision of low-cost MTC UEs based on LTE") has been approved which extends the scope of the study to also include study of coverage enhancements. More specifically, the updated SID states that:

A 20 dB improvement in coverage in comparison to defined LTE cell coverage footprint engineered for "normal LTE UEs" should be targeted for low-cost MTC UEs, using very low rate traffic with relaxed latency (e.g. size of the order of 100 bytes/message in UL and 20 bytes/message in DL, and allowing latency of up to 10 seconds for DL and up to 1 hour in uplink, i.e. not voice). In identifying solutions, any other related work agreed for Release 12 should be taken into account.

SUMMARY

Systems and methods related to a synchronization signal particularly well suited for wireless devices in an extended coverage area of a cell of a cellular communications network are disclosed. In one embodiment, a base station transmits a synchronization signal including multiple repetitions of a basic synchronization block during a coherence time of a downlink channel over which the synchronization signal is transmitted. The multiple repetitions of the basic synchronization block during the coherence time enable coherent combining during detection of the synchronization signal at wireless devices located in the cellular communications network. This coherent combining enables, for example, wireless devices located in an extended coverage area of a cell served by the base station to synchronize to the cell using a shorter synchronization signal than that which would be required if only non-coherent combining were used.

In one embodiment, the base station transmits the synchronization signal according to a multi-carrier transmission scheme, and the basic synchronization block includes a sequence of symbols transmitted over at least a subset of a number of subcarriers in a downlink bandwidth of the base station. For instance, in one particular embodiment, the cellular communications network is a Long Term Evolution (LTE) cellular communications network. Further, in one embodiment, the coherence time period of the downlink channel is one subframe. In another embodiment, the coherence time of the downlink channel is two subframes.

In one embodiment, the synchronization signal spans less than a full bandwidth of the downlink channel. In another embodiment, the synchronization signal spans the full bandwidth of the downlink channel.

In one embodiment, the base station transmits the synchronization signal such that the repetitions of the basic synchronization block include a first instance of the basic synchronization block and a second instance of the basic synchronization block that immediately follows the first instance of the basic synchronization block in time. In another embodiment, the base station transmits the synchronization signal such that the repetitions of the basic synchronization block include a first instance of the basic synchronization block and a second instance of the basic synchronization block that is separated from the first instance of the basic synchronization block in time.

In one embodiment, the base station transmits a primary synchronization signal and a secondary synchronization signal in addition to the synchronization signal. Further, in one embodiment, the primary and secondary synchronization signals have a different periodicity than the synchronization signal. In one particular embodiment, the periodicity of the synchronization signal is less than that of the primary and secondary synchronization signals.

In one embodiment, transmitting the synchronization signal includes block spreading the repetitions of the basic synchronization block. In one embodiment, transmitting the synchronization signal comprises transmitting the synchronization signal according to a multi-subcarrier signal based transmission scheme (e.g., an Orthogonal Frequency Division Multiplexing (OFDM) based transmission scheme) such that each repetition of the basic synchronization block is in a different multi-subcarrier signal symbol period. Further, block spreading the repetitions of the basic synchronization block includes applying a different element from a block spreading sequence to each repetition of the basic synchronization block.

In one embodiment, the synchronization signal further includes multiple repetitions of a second basic synchronization block during a second coherence time of the downlink channel over which the synchronization signal is transmitted. In one embodiment, the second coherence time immediately follows the coherence time in time. In another embodiment, the second coherence time is separated from the coherence time in time.

In one embodiment, the second basic synchronization block is different than the basic synchronization block. In another embodiment, the second synchronization block is the same as the synchronization block. Further, in one embodiment, transmitting the synchronization signal includes applying a block spreading sequence to the synchronization signal such that a first element from the block spreading sequence is applied to the repetitions of the basic synchronization block and a second element from the block spreading sequence is applied to the repetitions of the second basic synchronization block. In another embodiment, transmitting the synchronization signal includes applying a first block spreading sequence to the synchronization signal such that a first element from the first block spreading sequence is applied to the repetitions of the basic synchronization block and a second element from the first block spreading sequence is applied to the repetitions of the second basic synchronization block, and applying a second block spreading sequence to the repetitions of the basic synchronization block such that a different element from the second block spreading sequence is applied to each repetition of the basic synchronization block.

In one embodiment, the base station transmits the synchronization signal according to a frequency hopping scheme.

In one embodiment, the synchronization signal comprises a second part having a wider bandwidth than the repetitions of the basic synchronization block.

In one embodiment, transmitting the synchronization signal includes puncturing the synchronization signal to transmit one or more other signals within time and frequency resources that would otherwise be used for the synchronization signal. In another embodiment, transmitting the synchronization signal includes transmitting the synchronization signal using time and frequency resources mapped around time and frequency resources used for one or more other signals.

In one embodiment, the base station transmits the synchronization signal using a power boosting scheme. In another embodiment, the base station transits the synchronization signal using a beamforming transmission scheme.

In one embodiment, a wireless device configured to operate in a cellular communications network detects a synchronization signal in a downlink from a base station of the cellular communications network, wherein the synchronization signal includes multiple repetitions of a basic synchronization block during a coherence time of a downlink channel over which the synchronization signal is transmitted. In one embodiment, upon detecting the synchronization signal, the wireless device connects to a cell served by the base station. In one embodiment, the wireless device is a Machine Type Communication (MTC) device. Further, in one embodiment, the wireless device is an MTC device located in an extended coverage area of the cell served by the base station.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods related to a synchronization signal particularly well suited for wireless devices in an extended coverage area of a cell of a cellular communications network are disclosed. Before discussing various embodiments of the present disclosure, a brief discussion of Long Term Evolution (LTE) and the conventional synchronization signals used in LTE is beneficial. Note that while many of the embodiments described herein are described with respect to LTE and multi-subcarrier transmission schemes (e.g., Orthogonal Frequency Division Multiplexing (OFDM)), LTE or LTE-like terminology is sometimes used. However, embodiments described herein are not limited to LTE or multi-subcarrier transmission schemes. The synchronization signal described herein may be used in any suitable type of wireless communications system.

Figure 1:
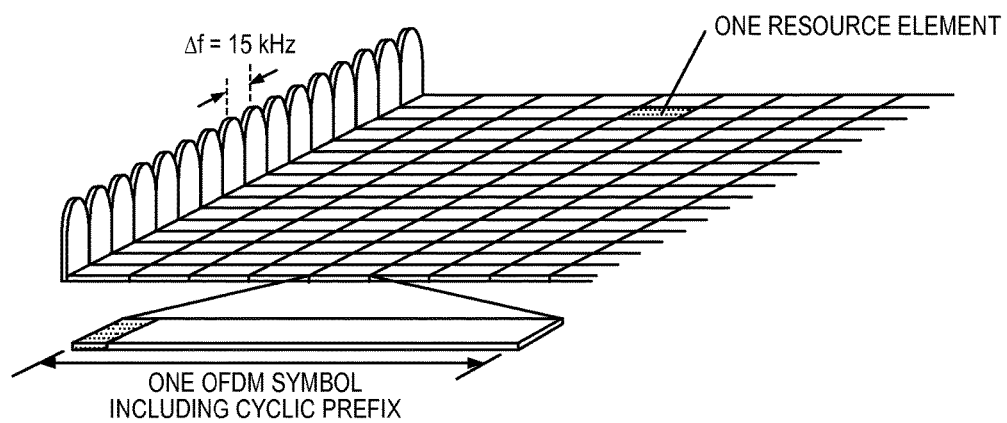
FIG. 1 illustrates a Long Term Evolution (LTE) downlink physical resource.
Figure 2:
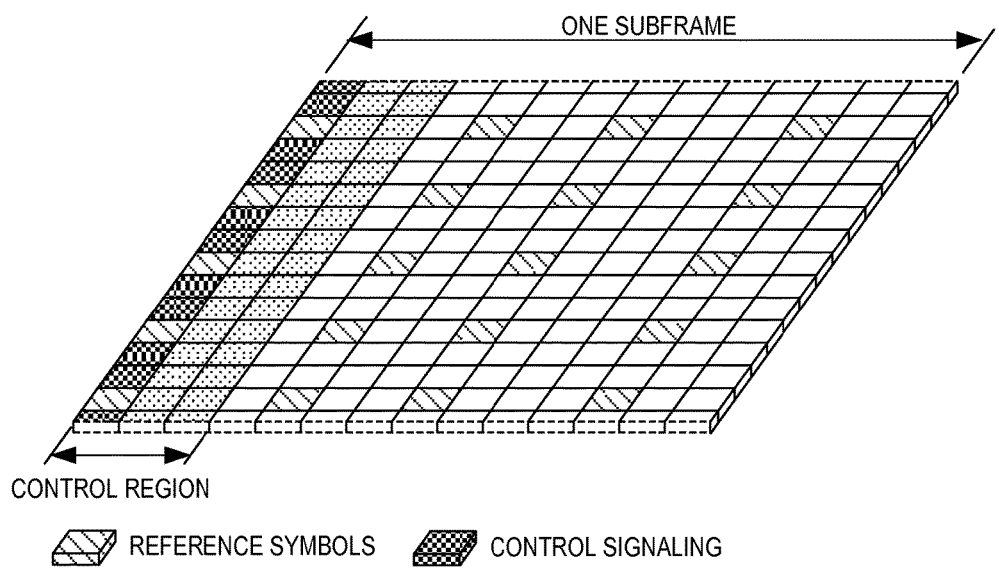
FIG. 2 illustrates a LTE downlink subframe.
Figure 3:
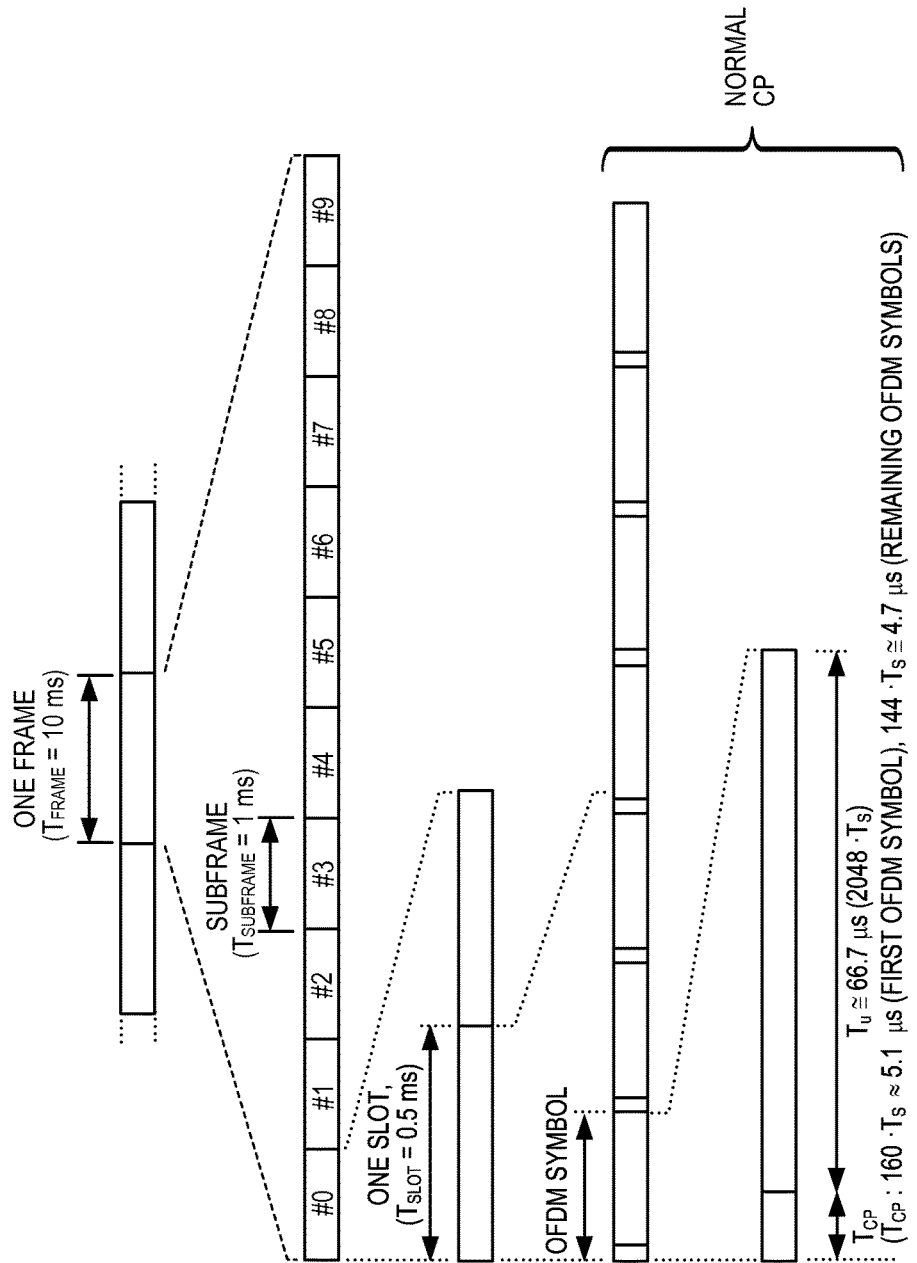
FIG. 3 illustrates a LTE downlink frame structure.

LTE is a mobile broadband wireless communication technology in which transmissions from base stations, which are referred to as Enhanced Node Bs (eNBs), to mobile stations, which are referred to as User Equipment devices (UEs), are sent using OFDM. OFDM splits the signal into multiple parallel sub-carriers in frequency. The basic unit of transmission in LTE is a Resource Block (RB) which in its most common configuration consists of 12 subcarriers and 7 OFDM symbols (one slot). A unit of one subcarrier and 1 OFDM symbol is referred to as a Resource Element (RE), as illustrated in FIG. 1. Thus, an RB consists of 84 REs. An LTE radio subframe is composed of multiple resource blocks in frequency with the number of RBs determining the bandwidth of the system and two slots in time, as illustrated in FIG. 2. Furthermore, the two RBs in a subframe that are adjacent in time are denoted as an RB pair. Currently, LTE supports standard bandwidth sizes of 6, 15, 25, 50, 75, and 100 RB pairs, which correspond to standard bandwidths of 1.4, 3, 5, 10, 15, and 20 Megahertz (MHz), respectively. In the time domain, LTE downlink transmissions are organized into radio frames of 10 milliseconds (ms), each radio frame consisting of ten equally-sized subframes of length $T_{subframe}=1$ ms, as illustrated in FIG. 3.

In LTE, a Primary Synchronization Signal (PSS) and a Secondary Synchronization Signal (SSS) are used to enable cell search as well as timing and frequency synchronization. Since the PSS and SSS are the first signals a UE tries to detect when accessing a new cell, the UE does not know anything about this new cell and also does not know anything about the PSS and SSS for this new cell (e.g., timing or PSS/SSS sequence). It is therefore important that the UE does not need to search blindly for a large number of possible sequences but preferably only has to search for one or only a few sequences. In LTE, the UE first searches for the PSS. LTE defines three different sequences for the PSS. Therefore, in order to detect the PSS, the UE has to search for three different PSS sequences. Once the UE has detected the PSS, the UE can decode the SSS. LTE defines 168 different sequences for the SSS. The possible sequences for the PSS and the SSS give 3*168=504 combinations and each combination can be used to uniquely identify 1 out of 504 cells. After detecting the PSS and the SSS, the UE knows the cell Identity (ID), as well as frequency and timing of the cell.

Figure 4:
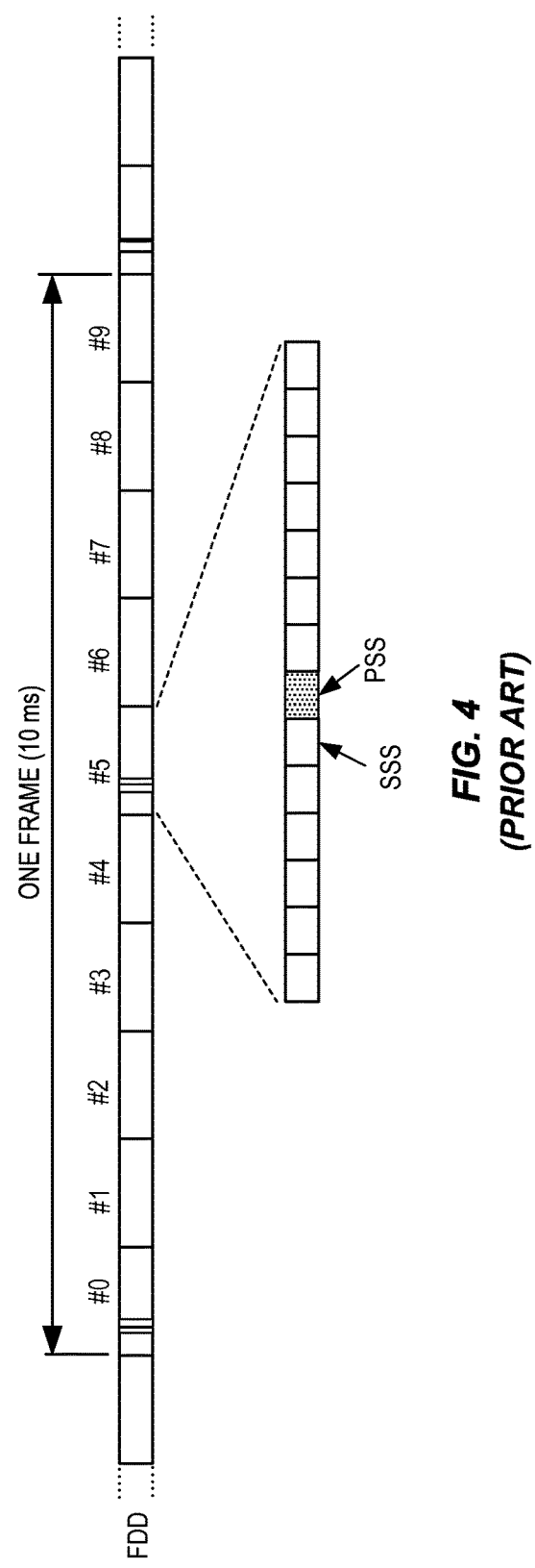
FIG. 4 illustrates a time-domain position of the Primary Synchronization Signal (PSS) and the Secondary Synchronization Signal (SSS) in the LTE downlink frame structure.

FIG. 4 illustrates the position of the PSS and the SSS in the time-domain LTE downlink frame structure. The PSS and the SSS each span 62 subcarriers (plus the Direct Current (DC) subcarrier) of one OFDM symbol (approximately 1 MHz). As illustrated in FIG. 4, the PSS and the SSS are each repeated twice every frame (i.e., once every 5 ms).

Figure 5:
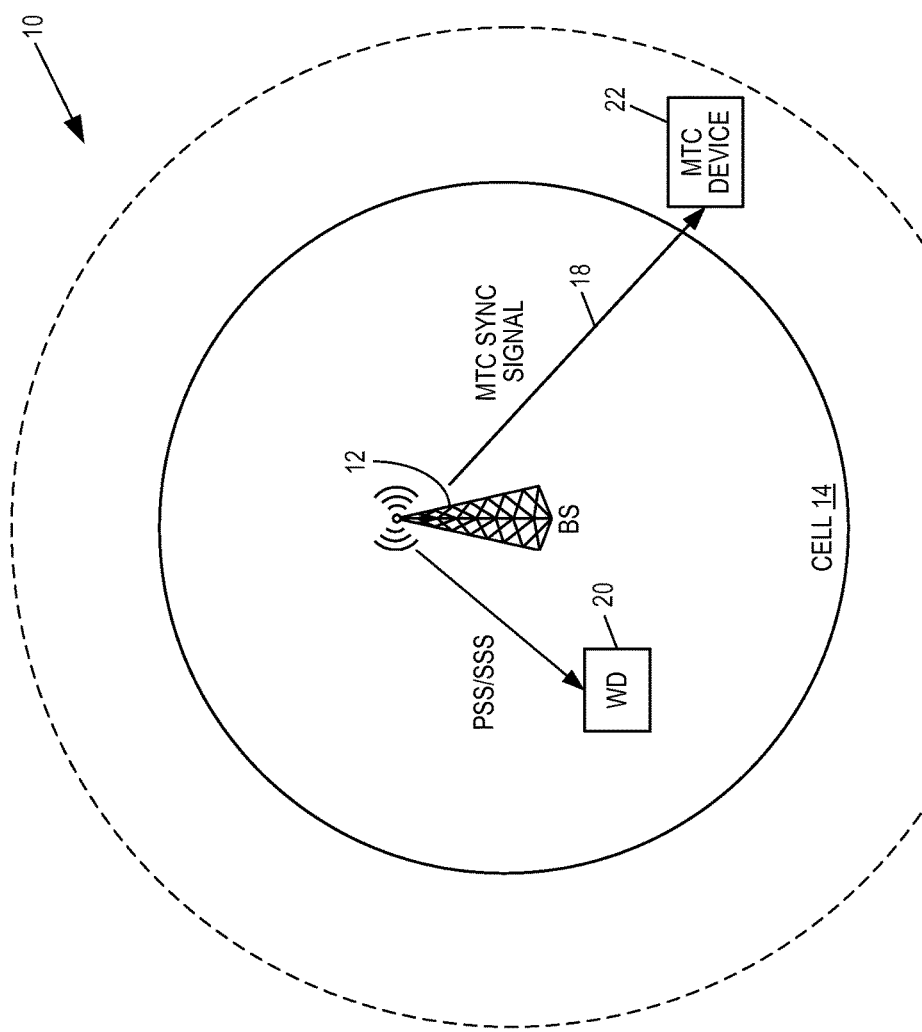
FIG. 5 illustrates a cellular communications network that includes a base station that transmits a synchronization signal having multiple repetitions of a basic synchronization block within a time period in which a downlink channel over which the base station transmits the synchronization signal is coherent according to one embodiment of the present disclosure.

One issue with the PSS in LTE is that the PSS is difficult, if not impossible, to detect by a wireless device, e.g., a Machine Type Communication (MTC) device, located in an extended coverage area of a cell. In this regard, FIG. 5 illustrates a cellular communications network 10 that includes a base station 12 that transmits a synchronization signal (referred to herein as an MTC sync signal) having multiple repetitions of a basic synchronization block within a coherence time of a downlink channel over which the base station 12 transmits the synchronization signal according to one embodiment of the present disclosure. Although the described solutions may be implemented in any appropriate type of cellular communications network supporting any suitable communications standards and using any suitable components, particular embodiments of the described solutions may be implemented in an LTE cellular communications network.

As illustrated, the cellular communications network 10 includes the base station 12 that serves a cell 14. While the base station 12 is illustrated and discussed herein, the functionality of the base station 12 described herein may be implemented in other types of radio access nodes. The cell 14 has an extended coverage area 16. The extended coverage area 16 is an area in which a difficulty in establishing a connection to the base station 12 is greater than a predefined threshold degree (e.g., impossible or practically impossible).

In one embodiment, the extended coverage area 16 is an area where a radio propagation path between a wireless device and the base station 12 (in terms of radio distance, e.g., highest received signal strength, highest Reference Signal Received Power (RSRP), highest Reference Signal Received Quality (RSRQ), or the like) is worse than a predefined threshold degree. In one particular embodiment, the extended coverage area 16 is an area where a path loss for a propagation path between a wireless device and the base station 12 (in terms of radio distance, e.g., highest received signal strength, highest RSRP, highest RSRQ, or the like) exceeds the typical path loss value of N Decibels (dB) in the cellular communications network 10 for a typical inter-site distance in the order of hundreds of meters. In the preferred embodiment illustrated in FIG. 5, the extended coverage area 16 is an area in which enhanced coverage is provided for low rate MTC devices such as, for example, a 20 dB enhancement as set forth in $3^{rd}$ Generation Partnership Project (3GPP) Technical Report (TR) 36.888 V2.0.0 (3GPP Tdoc RP-120714).

In this embodiment, the base station 12 transmits a PSS and a SSS in the conventional manner as well as an MTC synchronization signal 18. As discussed above, the PSS/SSS are detected by wireless devices, such as a wireless device 20, to determine the cell ID of the cell 14 as well as to obtain frequency and timing of the cell 14. However, the PSS is not easily detected or may be not be able to be detected at all by devices, such as an MTC device 22, located in the extended coverage area 16. One potential solution to enable devices, such as the MTC device 22, to detect the PSS is to combine, at the device, the received energy over multiple occurrences, or instances, of the PSS. However, using the MTC device 22 as an example, to obtain a coverage extension of 10 dB, the MTC device 22 would need to accumulate the received energy coherently over at least 10 occurrences of the PSS. Given that the PSS only occurs once every 5 ms, coherent combining is not possible in all scenarios, and one must revert back to non-coherent combining with lower performance.

The MTC synchronization signal 18 enables the MTC device 22 (and possibly any other device in the extended coverage area 16) to detect the MTC synchronization signal 18 using coherent combining, which has improved performance over non-coherent combining. Note that while in the embodiment of FIG. 5 the base station 12 transmits both PSS/SSS and the MTC synchronization signal 18, the present disclosure is not limited thereto. The base station 12 may alternatively transmit only the MTC synchronization signal 18. However, transmission of both PSS/SSS and the MTC synchronization signal 18 is advantageous in some implementations. For instance, transmission of both PSS/SSS and the MTC synchronization signal 18 allows for operation of both conventional wireless devices, e.g., the wireless device 20, with regular, or conventional, coverage and new wireless devices, e.g., the MTC device 22, with enhanced coverage, in the same cell 14 on the same carrier.

When transmitting both PSS/SSS and the MTC synchronization signal 18, the periodicity of the MTC synchronization signal 18 may be different than (e.g., less than) the periodicity of the PSS/SSS. This is particularly beneficial where the coverage enhancements resulting in the extended coverage area 16 are intended for applications with relaxed latency requirements. In this case, the reduced latency requirements may be exploited to reduce overhead. As an example, the MTC synchronization signal 18 may be transmitted one per second, whereas the PSS/SSS is transmitted twice every 10 ms (i.e., twice per 10 ms frame). In this way, increased latency can be traded for reduced overhead.

The periodicity of the MTC synchronization signal 18 can be fixed (e.g., fixed in the LTE standards) or network configurable. Further, in some scenarios, the MTC device 22 may non-coherently combine energy from multiple occurrences of the MTC synchronization signal 18 in order to acquire synchronization. In this case, if the periodicity is fixed, the MTC device 22 may be able to combine the energy from multiple occurrences, or transmissions, of the MTC synchronization signal 18 in a relatively straightforward way. Conversely, if the periodicity is variable, the MTC device 22 may have to resort to sync acquisition based on a single occurrence, or transmission, of the MTC synchronization signal 18, which, in some scenarios, may put a limit on the achievable coverage.

In some embodiments, the MTC synchronization signal 18 may not be transmitted very frequently (i.e., is transmitted infrequently). In this case, the processing involved in searching for the MTC synchronization signal 18 will be relatively long and potentially associated with relatively high power consumption. However, once the MTC device 22 has performed initial sync acquisition, the MTC device 22 will have some knowledge of when the MTC synchronization signal 18 is transmitted and can use this rough knowledge to minimize the processing involved if/when there is a need to re-acquire sync after a period of inactivity (e.g., Discontinuous Reception (DRX)).

Figure 6:
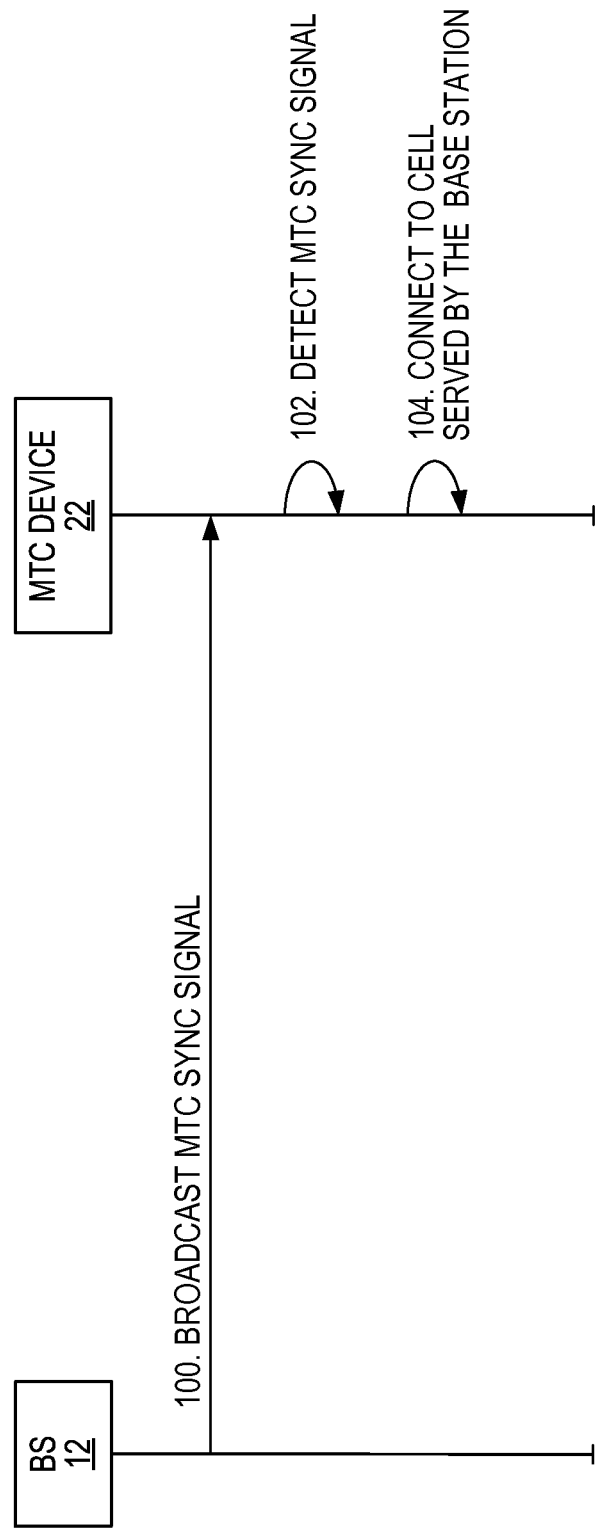
FIG. 6 illustrates the operation of the cellular communications network of FIG. 5 according to one embodiment of the present disclosure.

The operation of the cellular communications network 10 with respect to the MTC synchronization signal 18 is illustrated in FIG. 6. As illustrated, the base station 12 broadcasts the MTC synchronization signal 18 (step 100). In one preferred embodiment, the base station 12 broadcasts the MTC synchronization signal 18 in a downlink transmitted by the base station 12. As discussed below in detail, the MTC synchronization signal 18 includes multiple repetitions of a basic synchronization block during a time period in which a downlink channel over which the downlink is transmitted is coherent. This time period is also referred to herein as a coherence time of the downlink channel. In one embodiment, the coherence time is one subframe or two subframes of the downlink. Further, in this embodiment, the basic synchronization block is a sequence of symbols (e.g., a Zadoff-Chu sequence) mapped to a number of subcarriers during one OFDM symbol period. The MTC device 22 detects the MTC synchronization signal 18 using coherent combining across the multiple repetitions of the basic synchronization block (step 102). Then, in this example, the MTC device 22 connects to the cell 14 served by the base station 12 based on the frequency and timing obtained via the detection of the MTC synchronization signal 18 and a number (e.g., cell ID) derived from the MTC synchronization signal 18 (if different MTC synchronization signals 18 exist for different cells) (step 104).

Figure 7:
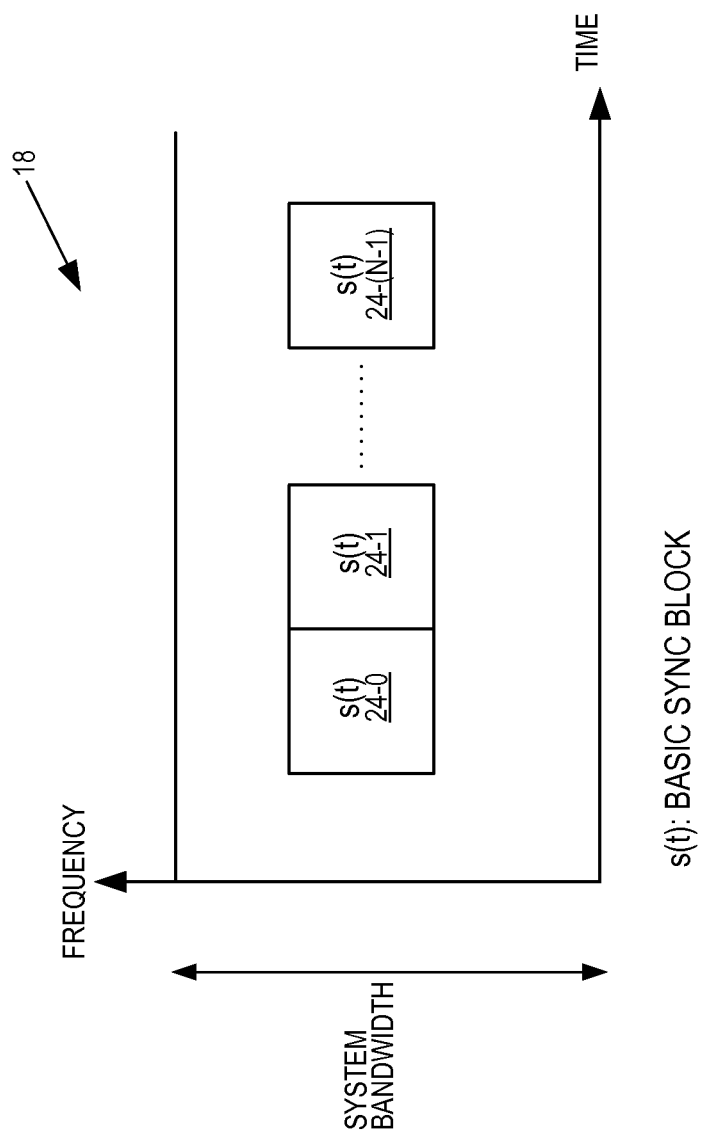
FIG. 7 illustrates the synchronization signal transmitted by the base station of FIGS. 5 and 6 according to one embodiment of the present disclosure.

One embodiment of the MTC synchronization signal 18 is illustrated in FIG. 7. As illustrated, the MTC synchronization signal 18 includes a number (N) of repetitions, or instances, 24-0 through 24-(N−1) (generally referred to herein collectively as repetitions 24 and individually as repetition 24) of a basic synchronization block s(t). Thus, the repetitions 24 include an initial, or first, instance 24-0 of the basic synchronization block s(t) followed by one or more additional instances 24-1 through 24-(N−1) of the basic synchronization block s(t). In one embodiment, the basic synchronization block s(t) has a similar structure as the PSS in LTE, i.e., a Zadoff-Chu sequence mapped to a number of OFDM subcarriers during an OFDM symbol period. In this case, in order to avoid a situation where a regular wireless device, e.g., the wireless device 20, detects the MTC synchronization signal 18 as the PSS, a Zadoff-Chu sequence other than the possible Zadoff-Chu sequences used in LTE for the PSS is preferably used. However, even though an LTE-like structure of the basic synchronization block s(t) is preferable, the basic synchronization block s(t) is not limited thereto. For example, the basic synchronization block s(t) may alternatively be an OFDM-modulated Frank sequence. The same basic synchronization block s(t) may be used for all cells in the cellular communications network 10 or, alternatively, two or more different synchronization blocks may be used throughout the cellular communications network 10 (e.g., neighboring cells may use different basic synchronization blocks).

As illustrated, the MTC synchronization signal 18 includes a dense repetition of the basic synchronization block s(t). This is important because the dense repetition of the basic synchronization block s(t) enables coherent combining at the MTC device 22. In the illustrated embodiment, the repetitions 24 immediately follow each other in time, i.e., the repetition 24-1 immediately follows the repetition 24-0 in time, the repetition 24-2 immediately follows the repetition 24-1 in time, and so on. However, in an alternative embodiment, at least some of the repetitions 24 may be separated in time, e.g., the repetition 24-1 may not immediately follow the repetition 24-0 in time, or in other words, for LTE, one or more OFDM symbol periods may separate adjacent repetitions 24 (e.g., repetitions 24-0 and 24-1). Preferably, the time periods, or gaps, between the repetitions 24 in this alternative embodiment are small in order to maximize the number (N) of repetitions 24 in the coherence time (e.g., one subframe) or, in other words, provide a large number (e.g., greater than 7 repetitions within one LTE subframe if every second OFDM is used or 14 repetitions if every OFDM symbol in a subframe is used) of repetitions 24 in the coherence time.

In this embodiment, a total length of the MTC synchronization signal 18 does not exceed a coherence time of a downlink channel over which the MTC synchronization signal 18 is transmitted. The coherence time is a channel property that depends on, e.g., mobility. Large speeds result in a short coherence time, whereas small speeds result in a large coherence time. Roughly, the coherence time is defined as $T_C=1/f_d$, where $f_d$ is the Doppler frequency, which is defined as $f_d=v \cdot f/c$ where v is speed in m/s, f is carrier frequency in Hertz (Hz), and c is the speed of light (i.e., $3 \times 10^8$ m/s). In some embodiments, the coherence time is, e.g., one subframe or two subframes. As such, in some embodiments, the total length of the MTC synchronization signal 18 is equal to or less than the coherence time of the downlink channel. However, as discussed below, in some embodiments, the total length of the MTC synchronization signal 18 may be extended to be longer than the coherence time of the downlink channel. Notably, as used herein, the total length of the MTC synchronization signal 18 is a time period spanned by the entire MTC synchronization signal 18 including, in this embodiment, all of the repetitions 24 of the basic synchronization block s(t).

In order to avoid a situation where the MTC synchronization signal 18 occupies all time and frequency resources during the time that the MTC synchronization signal 18 is transmitted, in one embodiment, the MTC synchronization signal 18 does not span the entire system bandwidth of the downlink from the base station 12, as illustrated in FIG. 7. For example, in an LTE system where the minimum system bandwidth is 1.4 MHz, the MTC synchronization signal 18 is preferably narrower than 1.4 MHz. If the MTC synchronization signal 18 does not occupy the full system bandwidth, the MTC synchronization signal 18 can be made longer than the MTC synchronization signal 18 could otherwise be if it would span the full system bandwidth since resources are still left for other channels and signals to maintain operation of the cellular communications network 10 (e.g. transmit data to wireless devices in parallel to MTC synchronization signal 18). However, having said this, in one alternative embodiment, the MTC synchronization signal 18 spans the entire system bandwidth of the downlink.

In the embodiment of FIG. 7, the MTC synchronization signal 18 utilizes a contiguous block of frequency resources (i.e., subcarriers). Further, the contiguous block of frequency resources are preferably located at a center of the system bandwidth of the downlink. However, in an alternative embodiment, the MTC synchronization signal 18 may use a set of frequency resources where two or more of the frequency resources are non-contiguous (i.e., not immediately adjacent) in frequency. For example, the MTC synchronization signal 18 may use every n-th subcarrier. This would result in the MTC synchronization signal 18 using a wider bandwidth.

Figure 8:
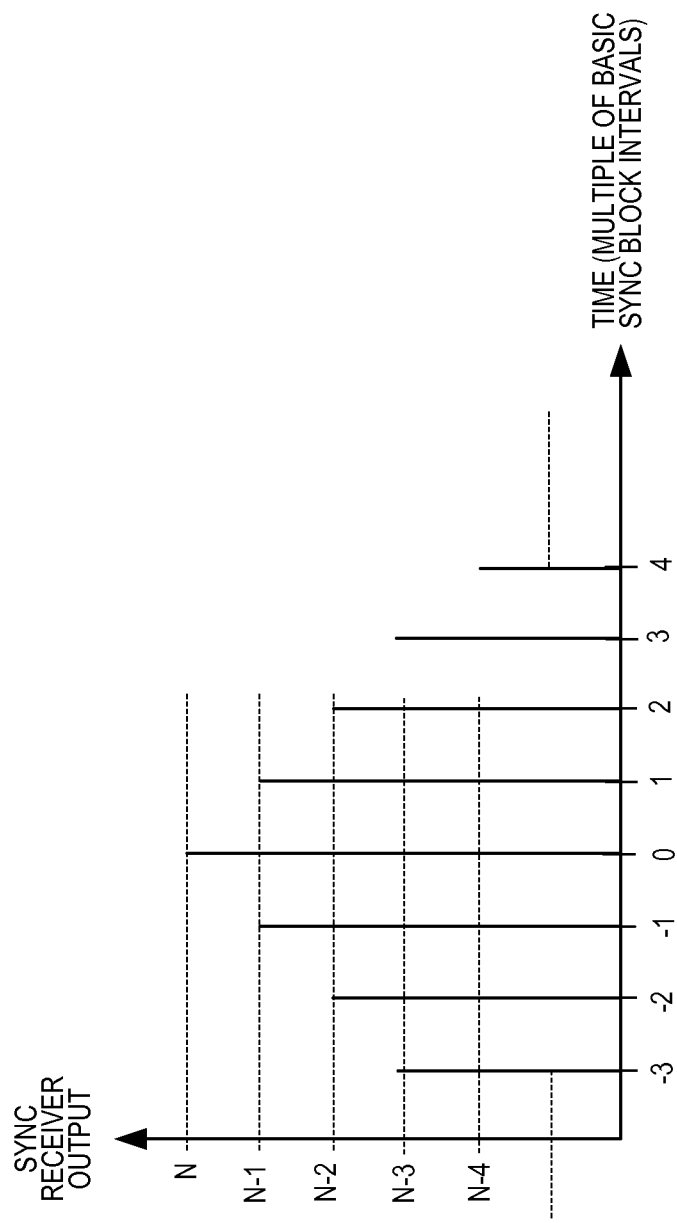
FIG. 8 illustrates an output of a synchronization signal receiver of a wireless device when the same basic synchronization block is repeated according to one exemplary implementation of the synchronization signal of FIG. 7.

One drawback with the pure repetition based embodiment of the MTC synchronization signal 18 illustrated in FIG. 7 is that an output of a synchronization signal receiver at the MTC device 22 will produce multiple correlation peaks, as illustrated in FIG. 8. This will result in a potentially high likelihood of false synchronization. The true timing is at the highest correlation peak when the synchronization signal receiver is synchronized with the MTC synchronization signal 18, which in FIG. 8 occurs at time=0. However, even for time offsets corresponding to one or multiple time-duration(s) of the basic synchronization block repetition interval, high correlation peaks are observed. For example, at a time offset of two basic synchronization block repetition intervals (time=2), there is still an overlap of N−2 repetitions 24 of the basic synchronization block s(t), where again N is the total number of repetitions 24 of the basic synchronization block s(t). This overlap of N−2 repetitions 24 of the basic synchronization block s(t) results in a high correlation peak.

Figure 9:
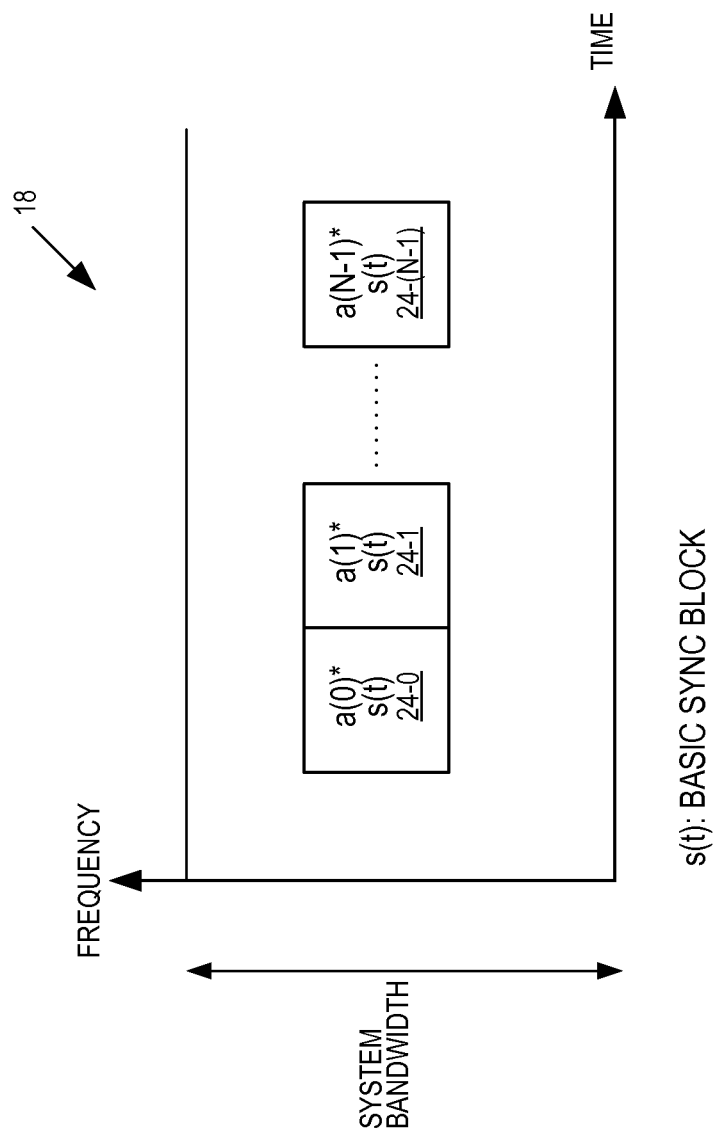
FIG. 9 illustrates the synchronization signal transmitted by the base station of FIGS. 5 and 6 according to another embodiment of the present disclosure in which block spreading is applied to the repetitions of the basic synchronization block.

FIG. 9 illustrates one embodiment of the MTC synchronization signal 18 that overcomes the drawback of the pure repetition based embodiment of the MTC synchronization signal 18 of FIG. 7. In this embodiment, block spreading is applied to the repetitions 24 of the basic synchronization block s(t) using sequence possessing good aperiodic auto-correlation properties. More specifically, as illustrated in FIG. 9, the repetitions 24-0 through 24-(N−1) of the basic synchronization block s(t) are multiplied by elements a(0), a(1), . . . , a(N−1), respectively, of a desired block spreading sequence. In particular, the elements a(0), a(1), . . . , a(N−1) are coefficients of the desired block spreading sequence. Note that some of the elements of the desired block spreading sequence may have the same value (e.g., 1 or −1). For example, if the number (N) of repetitions 24 of the basic synchronization block s(t) is 10 (around 10 dB), the block spreading sequence may be, for example, a Barker sequence of length 11 or 13. Table 1 below illustrates Barker sequences of length 11 and length 13 that may be used as the block spreading sequence in some embodiments.

TABLE 1

| Length N | Sequence [a(0), a(1), ... , a(N-1)] |
|---|---|
| 11 | +1 +1 +1 −1 −1 −1 +1 −1 −1 +1 −1 |
| 13 | +1 +1 +1 +1 +1 −1 −1 +1 +1 −1 +1 −1 +1 |

Figure 10:
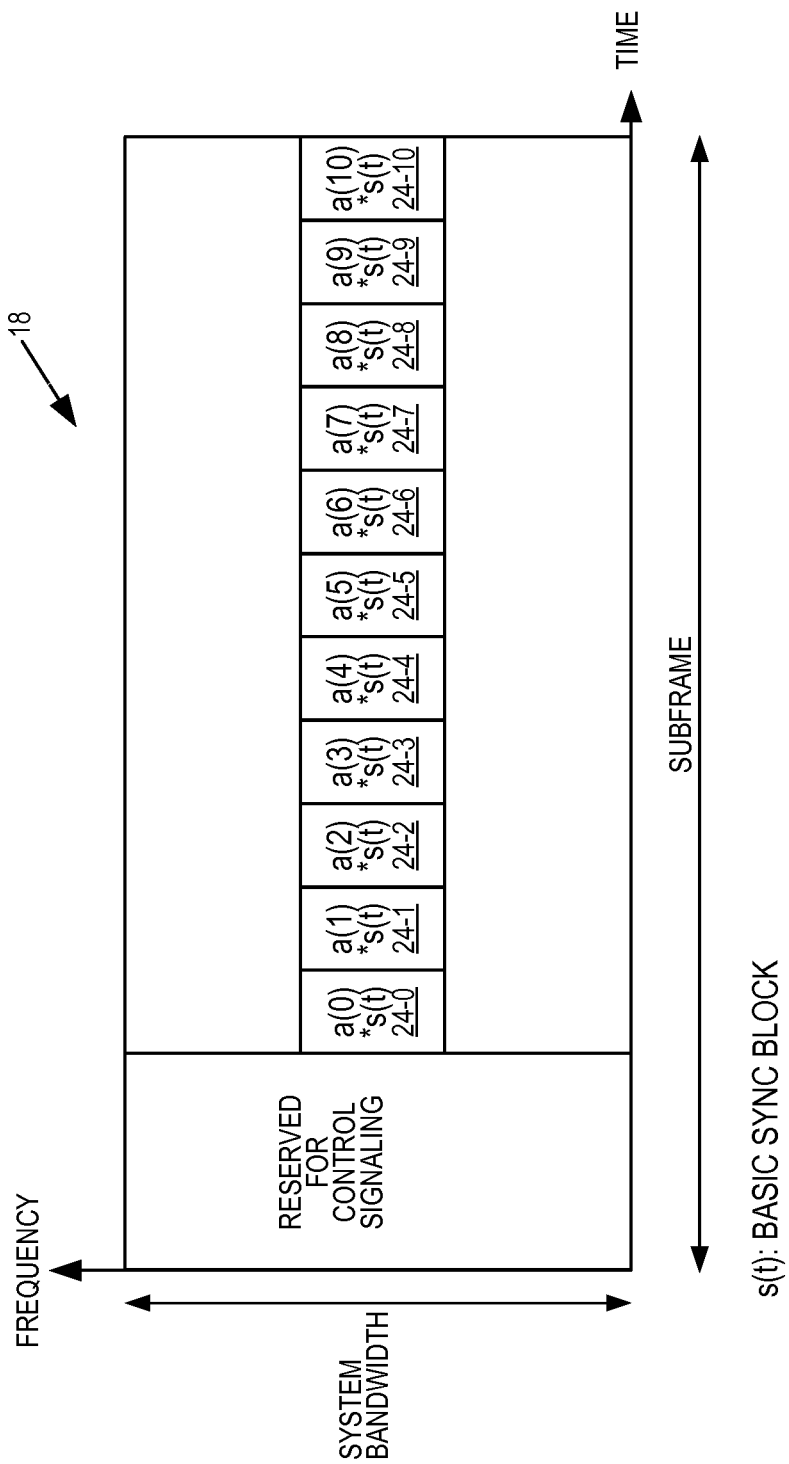
FIG. 10 illustrates the synchronization signal transmitted by the base station of FIGS. 5 and 6 according to another embodiment of the present disclosure in which block spreading is applied to the repetitions of the basic synchronization block and time and frequency resources are reserved for control signaling.

An LTE subframe consists of 14 OFDM symbols (in case of normal cyclic prefix), where 0 to 3 OFDM symbols are used for control signaling and cannot be used for the MTC synchronization signal 18. FIG. 10 illustrates an LTE subframe where the first 3 OFDM symbol periods are reserved for control signaling, and the MTC synchronization signal 18 occupies the remaining 11 OFDM symbol periods. In this embodiment, the MTC synchronization signal 18 includes 11 repetitions, namely, repetitions 24-0 through 24-10. The repetitions 24-0 through 24-10 of the MTC synchronization signal 18 are block spread with a block spreading sequence (e.g., a Barker sequence) of length 11. It is of course possible to use longer block spreading sequences as well so that the MTC synchronization signal 18 spans more than one subframe.

Again, note that different basic synchronization blocks (e.g., different Zadoff-Chu sequences) may be used to define different MTC synchronization signals 18 for different cells 14. In addition or alternatively to using different basic synchronization blocks, different block spreading sequences can be used to define different MTC synchronization signals 18 for different cells 14. For Barker sequences, only one sequence exists for a given length. Therefore, if Barker sequences are used for the different block spreading sequences, other block spreading sequences in addition to or as an alternative to the Barker sequence of the desired length can be used for different cells. The other block-spreading sequence can be any type of sequence having good auto-correlation properties, which is important to get a distinct peak, and good cross-correlation properties, which is important for sequence differentiation. Examples of such sequence families are Walsh-Hadamard sequences, Gold sequences, M-sequences, and Kasami sequences.

Figure 11:
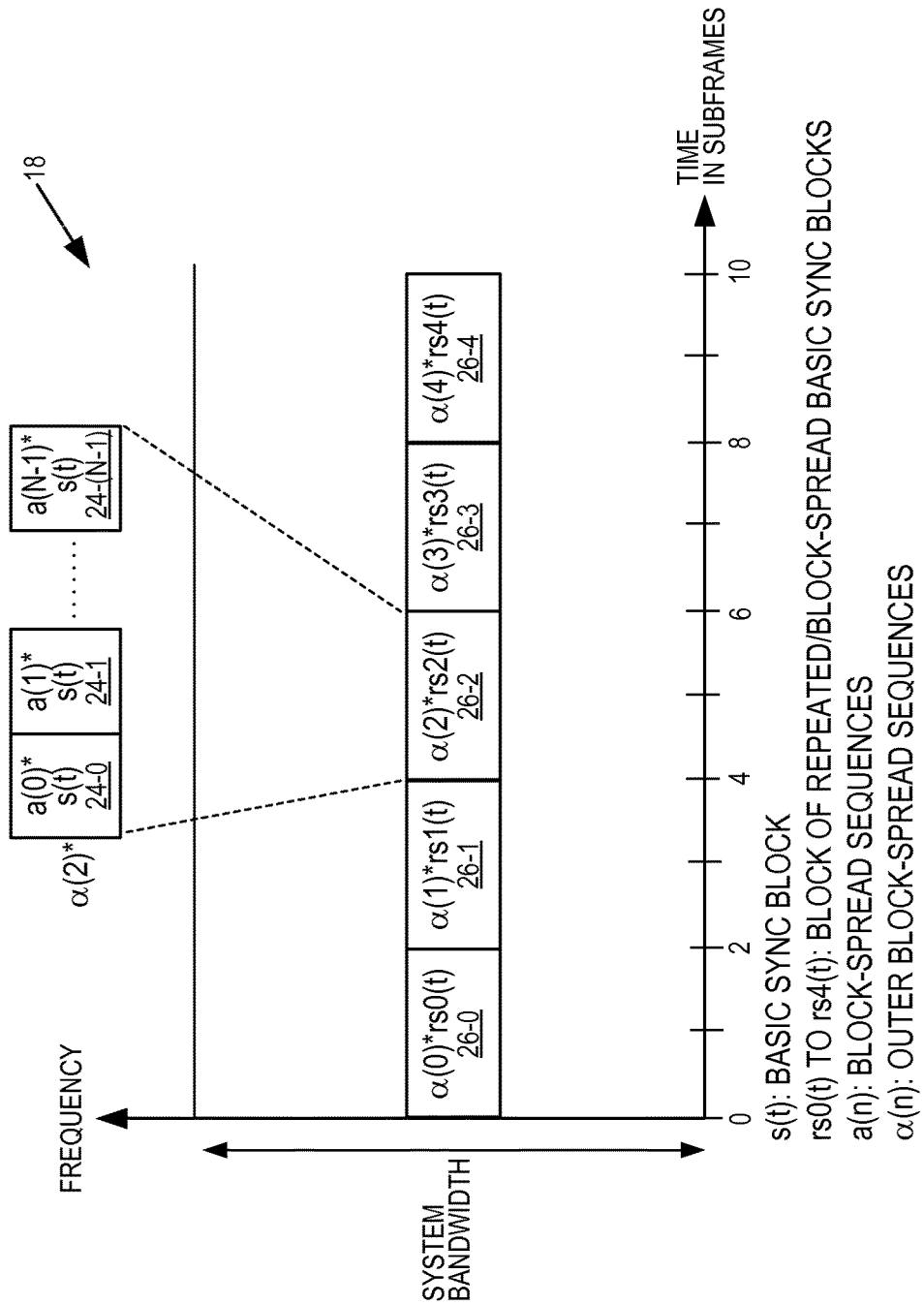
FIG. 11 illustrates the synchronization signal transmitted by the base station of FIGS. 5 and 6 according to another embodiment of the present disclosure in which the synchronization signal includes an outer repetition.

In the embodiments of FIGS. 7, 9, and 10, the MTC synchronization signal 18 spans a single coherence time of the downlink channel. However, the MTC synchronization signal 18 may be expanded to exceed the coherence time of the downlink channel. This may be beneficial where, for example, the number of required repetitions 24 to obtain a required link budget exceeds the coherence time of the downlink channel. In this regard, FIG. 11 illustrates one embodiment of the MTC synchronization signal 18 in which the MTC synchronization signal 18 spans multiple coherence time periods of the downlink channel. In this embodiment, the coherence time of the downlink channel is two subframes.

As illustrated, in this embodiment, the MTC synchronization signal 18 includes a number (M) of repeated blocks 26-0 through 26-4 (i.e., M=5), where each repeated block 26 spans two subframes such that the total length of the MTC synchronization signal 18 is ten subframes (i.e., one frame). Note that the two subframe length of the repeated blocks 26 and the total length of the MTC synchronization signal 18 illustrated in FIG. 11 is just one example. Other lengths of the repeated blocks 26 and/or other lengths of the MTC synchronization signal 18 may be used.

The repeated blocks 26-0 through 26-4 are generally referred to collectively as repeated blocks 26 and individually as repeated block 26. In this example, there are five repeated blocks 26. However, the MTC synchronization signal 18 of this embodiment may include any number of two or more of the repeated blocks 26. Each repeated block 26 includes a number of repetitions of a basic synchronization block s(t). Using the repeated block 26-2 as an example, the repeated block 26-2 includes a number (N) of repetitions 24 of the basic synchronization block s(t) that span, in this example, two subframes. Further, in this example, the repetitions 24 of the basic synchronization block s(t) are block spread by a desired block spreading sequence a(0) through a(N−1), as described above. Note, however, that block spreading is optional. The optional block spread repetitions 24 of the basic synchronization block s(t) forming the repeated block 26-2 is referenced as rs2(t).

In a similar manner, each of the other repeated blocks 26 includes a number of repetitions of corresponding basic synchronization blocks s(t) that, in this example, span two subframes. Further, block spreading may optionally be applied in each of the repeated blocks 26. These optional block spread repetitions of the corresponding basic synchronization blocks s(t) in the repeated blocks 26-0 through 26-4 are referenced as rs0(t) through rs4(t), respectively. Note, however, that the repeated blocks 26 may use the same basic synchronization blocks s(t) or, alternatively, some or all of the repeated blocks 26 may use different basic synchronization blocks s(t). Likewise, if block spreading is applied within the repeated blocks 26, the repeated blocks 26 may use the same block spreading sequence or, alternatively, some or all of the repeated blocks 26 may use different block spreading sequences. In addition, each of the repeated blocks 26 may include the same number of repetitions of the corresponding basic synchronization block(s) s(t) or, alternatively, some or all of the repeated blocks 26 may include different numbers of repetitions of the corresponding basic synchronization block(s) s(t). Still further, an outer block spreading sequence $\alpha(0)$ through $\alpha(4)$ is optionally applied to the repeated blocks 26. Where different block spreading sequences are used, the outer block spreading sequence may be folded into the different block spreading sequences of the repeated blocks 26.

In this embodiment, the MTC synchronization signal 18 can be detected by performing, at the MTC device 22, coherent combining of the repetitions within each of the repeated blocks 26 (which in this example each have a length of two subframes) and non-coherent combining of the repeated blocks 26 over the total length of the MTC synchronization signal 18. Note that while the repeated blocks 26 are illustrated in this example as being immediately consecutive in time (i.e., there are no time gaps between any two of the repeated blocks 26), the MTC synchronization signal 18 is not limited thereto. In another embodiment, a time gap (e.g., one or more OFDM symbol periods) is present between at least some of the adjacent repeated blocks 26 (e.g., between repeated blocks 26-0 and 26-1). Since combining across the repeated blocks 26 is non-coherent, such time gaps are not problematic.

Figure 12:
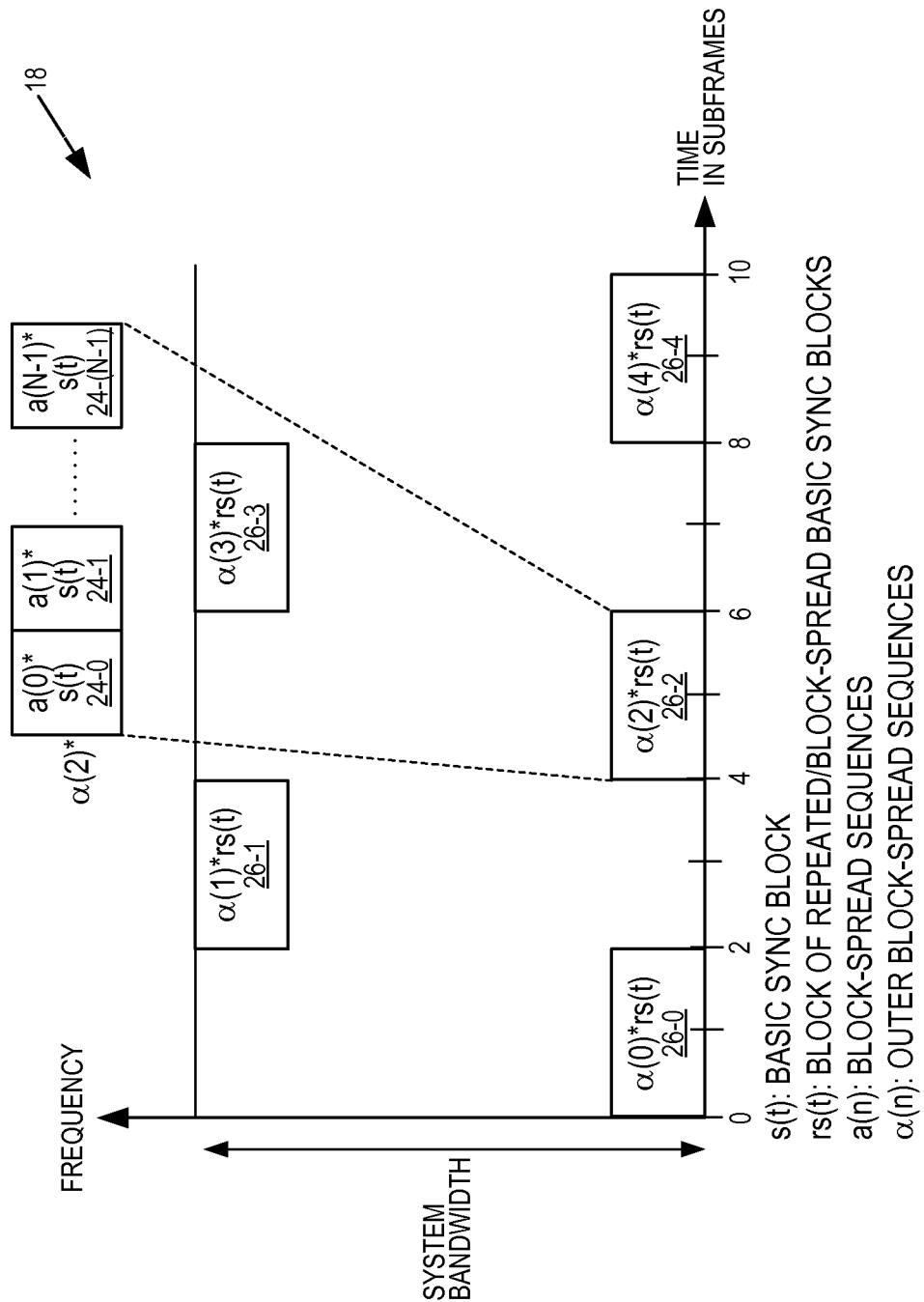
FIG. 12 illustrates the synchronization signal transmitted by the base station of FIGS. 5 and 6 according to another embodiment of the present disclosure in which a frequency-hopping scheme is applied.

FIG. 12 illustrates an embodiment of the MTC synchronization signal 18 that is similar to that of FIG. 11 but where a frequency hopping scheme is applied according to another embodiment of the present disclosure. In this embodiment, rather than transmitting all of the repeated blocks 26 using the same frequency resources, the repeated blocks 26 are transmitted using different frequency resources defined by a frequency hopping pattern. While FIG. 12 illustrates a simple frequency hopping pattern that alternates between two different sets of frequency resources, other frequency hopping patterns may be used. For example, a more complicated frequency hopping pattern may be used. If a more complicated frequency hopping pattern is used, it is important that the next frequency position can be derived from the current frequency position.

In one embodiment, the frequency hopping distance (i.e., the distance in frequency between hops) is maximized. Therefore, in the example of FIG. 12, the sets of frequency resources corresponding to the two frequency hopping positions are at the extreme positions within the system bandwidth. Note, however, that LTE supports several system bandwidths, and the MTC device 22 may have no a-priori knowledge about the actual system bandwidth of the downlink from the base station 12. In this case, the frequency hops may be confined due to the minimum system bandwidth, i.e. 1.4 MHz in LTE.

Figure 13:
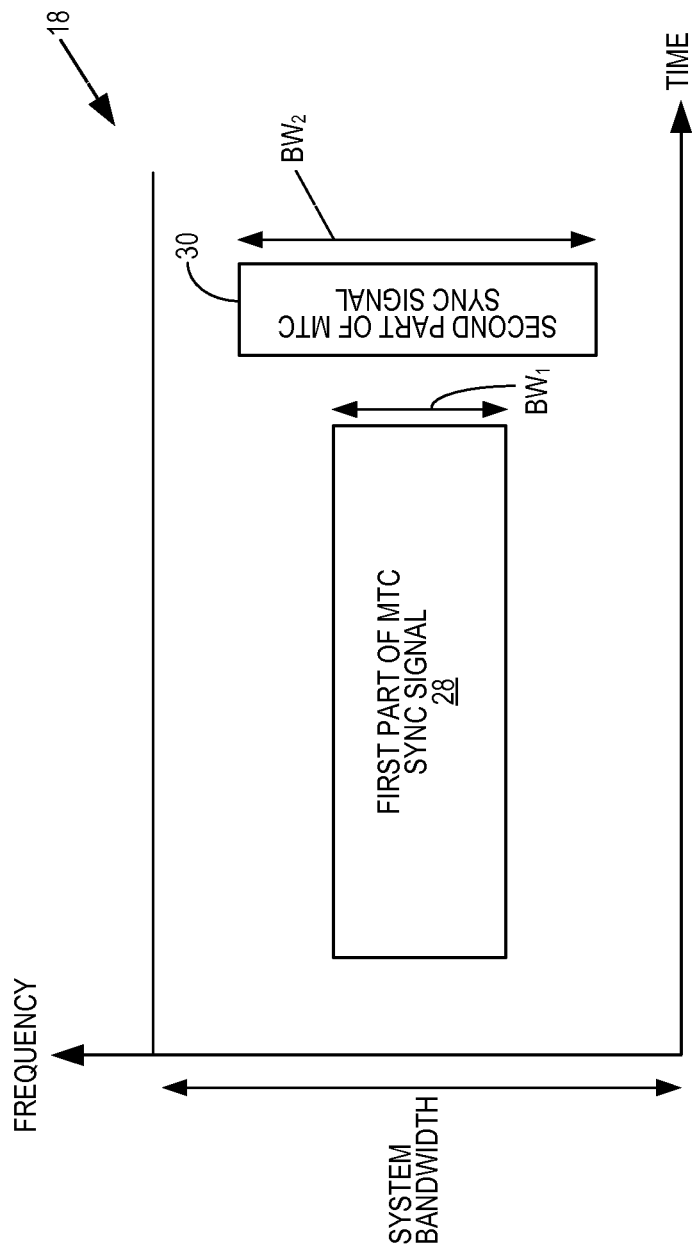
FIG. 13 illustrates the synchronization signal transmitted by the base station of FIGS. 5 and 6 according to another embodiment of the present disclosure in which the synchronization signal includes a first part and a second part having a wider bandwidth than the first part.

As discussed above, in one embodiment, the MTC synchronization signal 18 does not span the entire system bandwidth of the downlink from the base station 12. In one preferred embodiment, the MTC synchronization signal 18 spans less than the minimum system bandwidth, which for LTE is 1.4 MHz. However, one issue is that the narrow bandwidth of the MTC synchronization signal 18 leads to worse timing estimation than a wider bandwidth synchronization signal. In order to address this issue, FIG. 13 illustrates the MTC synchronization signal 18 according to one embodiment of the present disclosure in which the MTC synchronization signal 18 includes a first part 28 and a second part 30 having a wider bandwidth than the first part 28. The first part 28 takes the form of any one of the embodiments of the MTC synchronization signal 18 described above with respect to FIGS. 7, 9, 10, 11, or even 12. The second part 30 can take any desired form, but has a bandwidth ($BW_2$) that is greater than a bandwidth ($BW_1$) of the first part 28 of the MTC synchronization signal 18. The wider bandwidth of the second part 30 can be used to provide improved timing estimation.

Preferably, the sequences used in the first and second parts 28 and 30 are related, i.e., if the MTC device 22 is able to detect the first part 28, then the MTC device 22 knows (at least partly) which sequence(s) are used in the second part 30 of the MTC synchronization signal 18. One example of the second part 30 is the Common Reference Signal (CRS) or Evolved/Enhanced Synchronization Signal (ESS) in LTE. The second part 30 of the MTC synchronization signal 18 may follow immediately after the first part 28 in time or there may be a time gap between the first and second parts 28 and 30.

Figure 14:
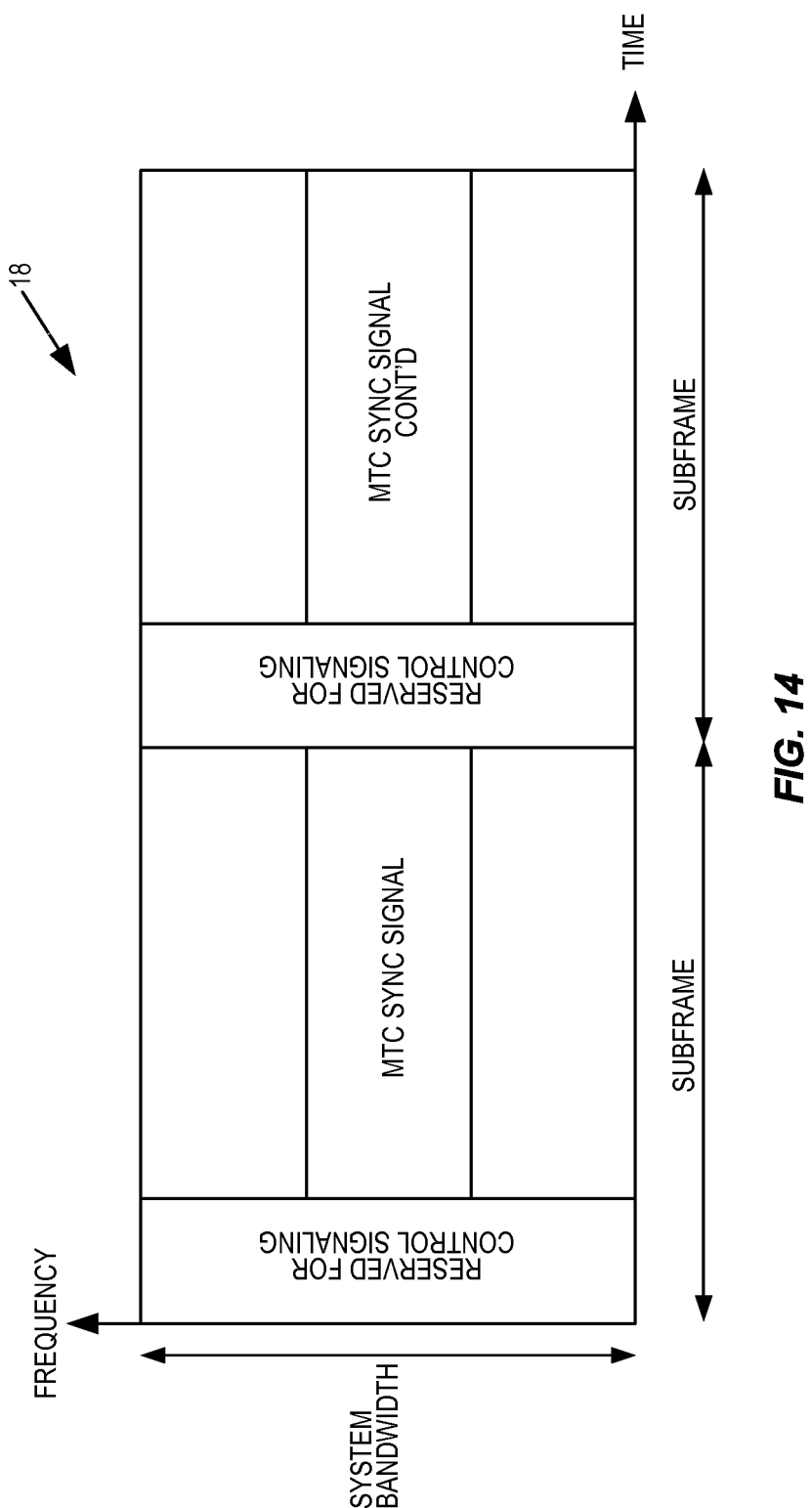
FIG. 14 illustrates the synchronization signal transmitted by the base station of FIGS. 5 and 6 according to another embodiment of the present disclosure in which the synchronization signal is punctured or mapped around time and frequency resources allocated for one or more other signals.

In any of the embodiments described above, the MTC synchronization signal 18 may use time and frequency resources that are mapped around time and frequency resources used by one or more other signals (e.g., control signals such as Physical Downlink Control Channel (PDCCH), Physical Hybrid Automatic Repeat Request Indicator Channel (PHICH), Physical Control Format Indicator Channel (PCFICH), etc.) or the MTC synchronization signal 18 may be punctured such that time and frequency resources that would have otherwise been used by the MTC synchronization signal 18 are used for one or more other signals (e.g., reference symbols such as CRS, Channel State Information Reference Signal (CSI-RS), ESS, etc.). In this regard, FIG. 14 illustrates one embodiment of the MTC synchronization signal 18 in which the MTC synchronization signal 18 is mapped around time and frequency resources reserved for control signaling. More specifically, in this example, the MTC synchronization signal 18 spans two subframes. To enable scheduling in the downlink (assuming the MTC synchronization signal 18 does not span the entire system bandwidth for the downlink) and scheduling in the uplink, it is desirable for the base station 12 to transmit control signaling in the downlink. Therefore, in this example, the MTC synchronization signal 18 is mapped around the first three or four OFDM symbol periods in each of the two subframes, which are reserved for control signaling. This mapping is known or made known to the MTC device 22.

Figure 15:
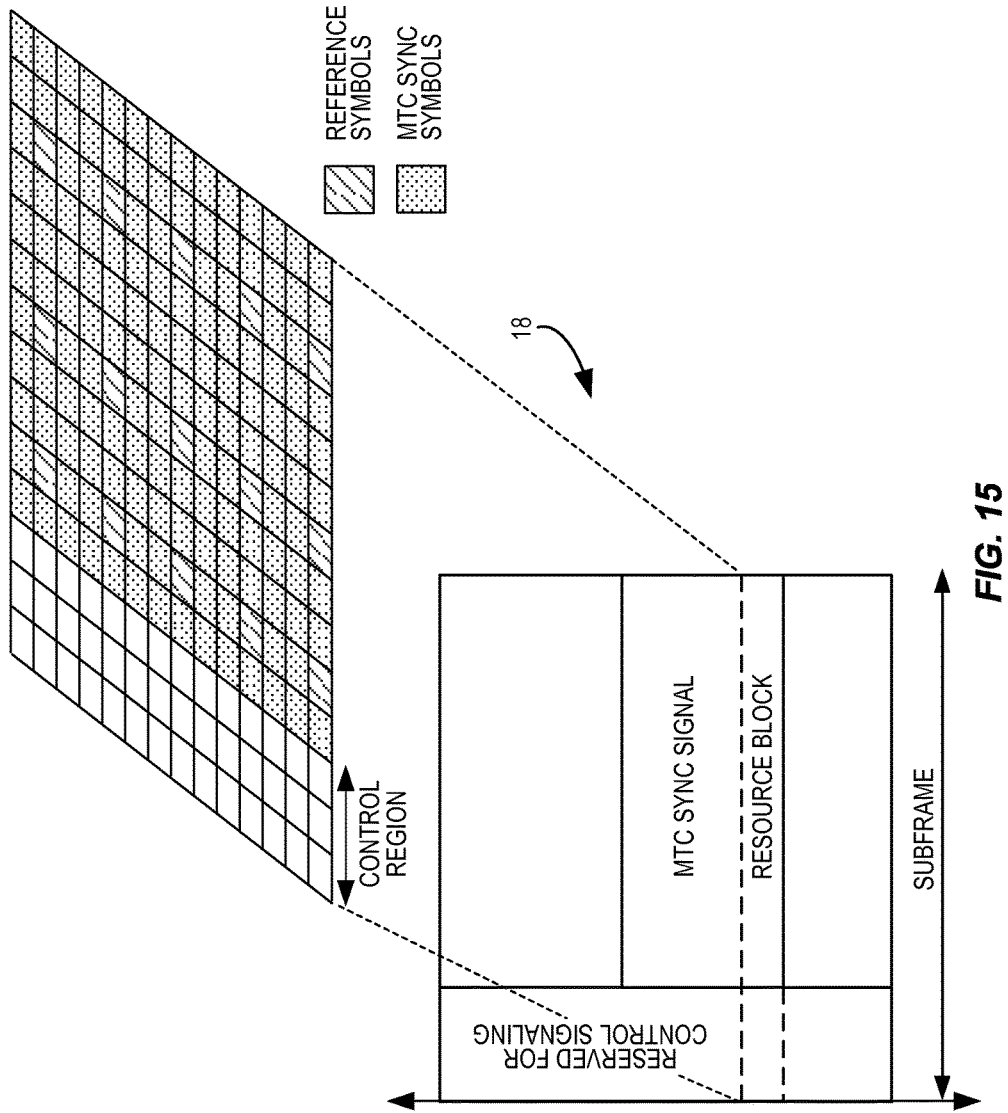
FIG. 15 illustrates the synchronization signal transmitted by the base station of FIGS. 5 and 6 according to yet another embodiment of the present disclosure in which the synchronization signal is punctured or mapped around time and frequency resources allocated for one or more other signals.

FIG. 15 illustrates one embodiment of the MTC synchronization signal 18 in which the MTC synchronization signal 18 is punctured to, in this example, enable transmission of one or more reference signals. This puncturing may be used in addition to or without the mapping of FIG. 14. More specifically, there may be a need for the base station 12 to transmit other signals (e.g., CRS, CSI-RS, ESS, etc.), which may be in addition to the control signaling discussed above. Since conventional wireless devices, e.g., the wireless device 20, expect these signals to be present, the MTC synchronization signal 18 is, in this embodiment, punctured to allow transmission of these other signals. In other words, even though certain time and frequency resources are within a time-frequency plane that is in principal occupied by the MTC synchronization signal 18, these time and frequency resources are not used for the MTC synchronization signal 18, but instead are used for transmission of the other signals. In one embodiment, the MTC device 22 is unaware of the puncturing, in which case performance of the synchronization process at the MTC device 22 may be slightly degraded. However, the amount of puncturing is such that the synchronization process is not degraded beyond some acceptable degree. In an alternative embodiment, the MTC device 22 is aware or made aware of which time and frequency resources are used for the transmission of the other signals, in which case the MTC synchronization signal 18 may be mapped around those time and frequency resources in a manner similar to that described above with respect to FIG. 14.

Figure 16:
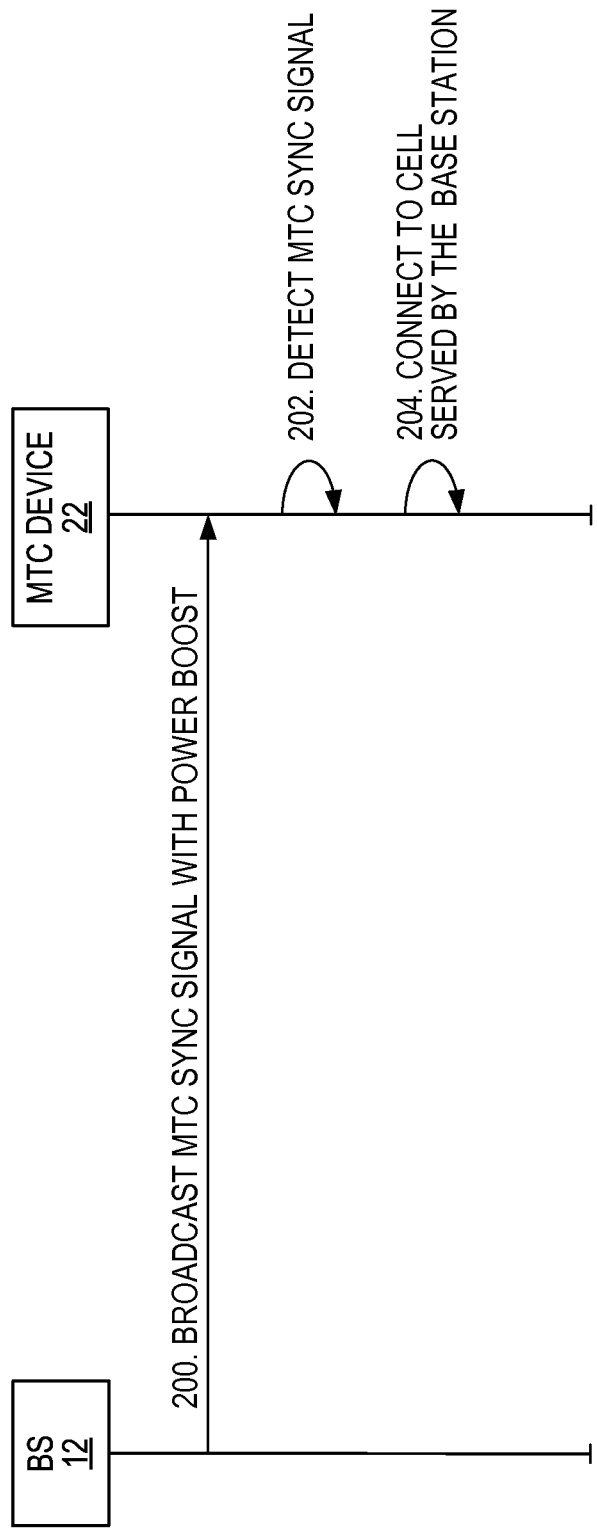
FIG. 16 illustrates the operation of the cellular communications network of FIG. 5 in which the base station transmits the synchronization signal using a power boosting scheme according to another embodiment of the present disclosure.

In the embodiments of the MTC synchronization signal 18 described above, the required length or duration of the MTC synchronization signal 18 can be shortened if the power of the transmission of the MTC synchronization signal 18 is increased. This is because detection of the MTC synchronization signal 18 requires a certain amount of energy (i.e., power times time). FIG. 16 illustrates the operation of the cellular communications network 10 of FIG. 5 according to one embodiment in which the base station 12 utilizes a power boosting scheme to increase the power of the transmission of the MTC synchronization signal 18. As illustrated, the base station 12 broadcasts the MTC synchronization signal 18 using a power boosting scheme (step 200).

In one embodiment, the MTC synchronization signal 18 spans less than the full system bandwidth of the downlink. Since the MTC synchronization signal 18 does not span the entire system bandwidth of the downlink, the power boosting scheme can boost the transmission power of the MTC synchronization signal 18 by effectively stealing power from at least some of the subcarriers that are not used (or used at reduced power) for the MTC synchronization signal 18 and applying this stolen power to the MTC synchronization signal 18. More specifically, by not transmitting on at least some, and potentially all, subcarriers that are not used for the MTC synchronization signal 18, according to OFDM, the power that would have been applied to those subcarriers is re-distributed to the subcarriers that are used for transmission (which include at least the subcarriers used for the MTC synchronization signal 18). The MTC device 22 detects the MTC synchronization signal 18 and, in this example, then connects to the cell 14 served by the base station 12 (steps 202 and 204).

Figure 17:
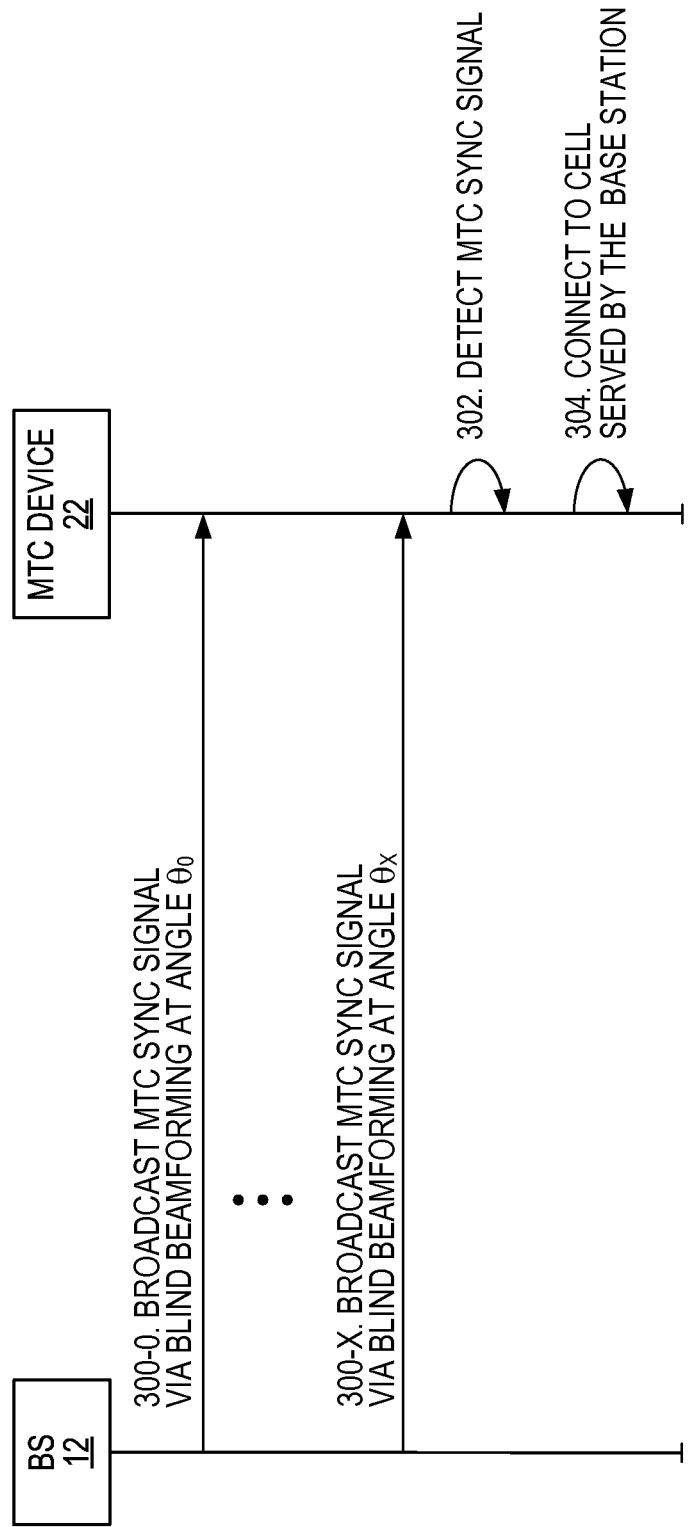
FIG. 17 illustrates the operation of the cellular communications network of FIG. 5 in which the base station transmits the synchronization signal using a blind beamforming scheme according to another embodiment of the present disclosure.

In another embodiment of the present disclosure, beamforming is utilized for transmission of the MTC synchronization signal 18 and/or the conventional synchronization signals (PSS/SSS). The advantage of beamforming is that the transmitted power is concentrated in one or a few directions and by that increase the received power at the receiving device. In this regard, FIG. 17 illustrates the operation of the cellular communications network 10 of FIG. 5 according to one embodiment in which the base station 12 utilizes a blind beamforming scheme to transmit the MTC synchronization signal 18 to the MTC device 22. Notably, a similar blind beamforming scheme may be used for transmission of PSS/SSS. As illustrated, the base station 12 broadcasts the MTC synchronization signal 18 via blind beamforming at an angle $\theta_0$ (step 300-0). Beamforming may be applied with or without the power boosting scheme of FIG. 16. The base station 12 continues to transmit the MTC synchronization signal 18 via blind beamforming at different angles $\theta_1$, $\theta_2$, etc. until the base station 12 transmits the MTC synchronization signal 18 via blind beamforming at an angle $\theta_X$ that corresponds to a position of the MTC device 22 (step 300-X). At that point, the MTC device 22 is able to detect the MTC synchronization signal 18 (step 302). Then, in this example, the MTC device 22 connects to the cell 14 served by the base station 12 (step 304). Notably, the base station 12 does not stop transmitting the MTC synchronization signal 18 at the angle $\theta_X$ since the base station 12 does not know if there are other MTC devices 22 that would be served at other angles. In other words, the base station 12 cycles through all angles and is periodically repeated.

The embodiments described thus far can be used whether the MTC device 22 is mobile or static. However, in some cases, it may be known that the MTC device 22 is static. If the MTC device 22 is static, the following embodiments may be used. In one embodiment, the base station 12 uses beamforming and/or power boosting to transmit PSS/SSS and/or the MTC synchronization signal 18 to locations where static MTC devices, e.g., the MTC device 22, are known to be located. For example, in one particular embodiment, the base station 12 uses power boosting and/or beamforming for transmission of PSS/SSS to enable initial synchronization of the MTC device 22 using PSS/SSS. However, after this initial synchronization, if synchronization is lost, the MTC device 22 may regain synchronization by detecting only the MTC synchronization signal 18. Power boosting and/or beamforming may also be used for the MTC synchronization signal 18. Such a scheme may be desirable because, after initial synchronization, the physical cell ID has been acquired, the cycle prefix length has been detected, the Time Division Duplexing (TDD)/Frequency Division Duplexing (FDD) mode has been detected, etc. Once a static device has obtained this information, this information will not change, or at least will only infrequently change. As such, if the static device loses synchronization, the static device can regain synchronization by detecting the MTC synchronization signal 18 (i.e., there is no need to always detect the PSS/SSS). As an alternative embodiment, this can be applied only to SSS.

The MTC synchronization signal 18 can be transmitted using either the same time and frequency resources for all cells 14 or transmitted using different time and frequency resources at least for neighboring cells 14. If different time and frequency resources are used within different cells 14, then the time and frequency resources allocated for the MTC synchronization signal 18 can be indicated to the static devices using either dedicated signaling or via broadcasting. Using different time and frequency resources for the MTC synchronization signal 18 in at least in neighboring cells 14 minimizes the problems with other-cell interference in the synchronization channels that the other solutions above, e.g. power boosting, entail.

Figure 18:
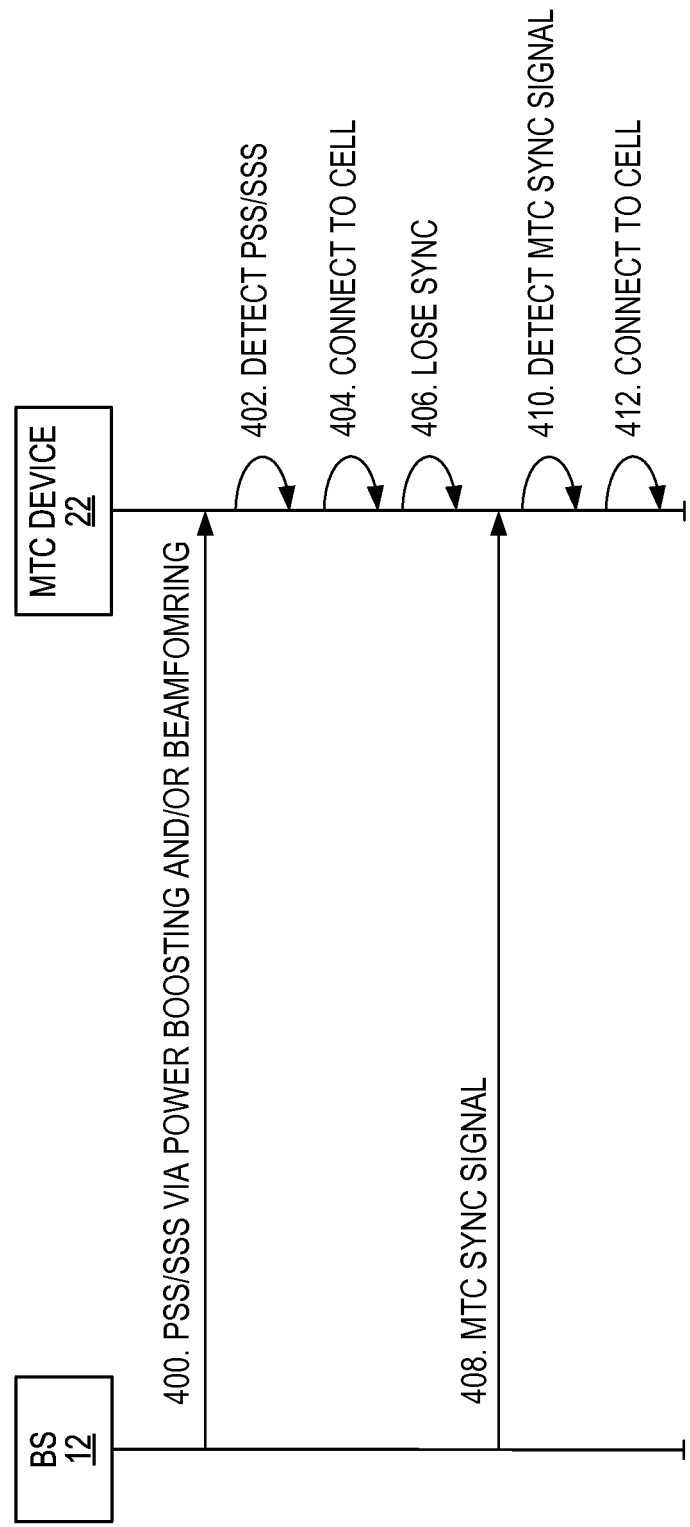
FIG. 18 illustrates the operation of the cellular communications network of FIG. 15 according to yet another embodiment of the present disclosure.

FIG. 18 illustrates the operation of the cellular communications network 10 according to another embodiment in which the base station 12 transmits PSS/SSS and the MTC synchronization signal 18 and a static MTC device 22 performs initial synchronization based on PSS/SSS and a subsequent synchronization based on the MTC synchronization signal 18. As illustrated, the base station 12 transmits PSS/SSS (step 400). Optionally, power boosting and/or beamforming may be applied. The MTC device 22, which in this example is static, detects the PSS/SSS and connects to the cell 14 served by the base station 12 (steps 402 and 404). Sometime thereafter, the MTC device 22 loses synchronization (step 406). Note that step 406 is not an active step (i.e., the MTC device 22 does not actively lose synchronization). Rather, the loss of synchronization is something that occurs due to, for example, being in an idle mode or deteriorating channel conditions.

When the MTC device 22 desires to regain synchronization, the MTC device 22 detects the MTC synchronization signal 18 transmitted by the base station 12 (steps 408 and 410). Notably, in this example, the base station 12 transmits both PSS/SSS and the MTC synchronization signal 18, but possibly with different periodicities. Upon detecting the MTC synchronization signal 18, the MTC device 22 has regained synchronization and, in this example, reconnects to the cell 14 served by the base station 12 (step 412).

In addition to the initial synchronization, the MTC device 22 may at some point synchronize to PSS/SSS in order to, for example, obtain any updated information such as cell ID, cyclic prefix length, etc. This may be particularly beneficial in the case of a Self Optimizing Network (SON). For instance, synchronization to the PSS/SSS may be desired for new cell/base station establishment. In one embodiment, when there is a network update, power boosting and/or beamforming may be applied for PSS/SSS in order to enable detection of the PSS/SSS by the MTC device 22.

Figure 19:
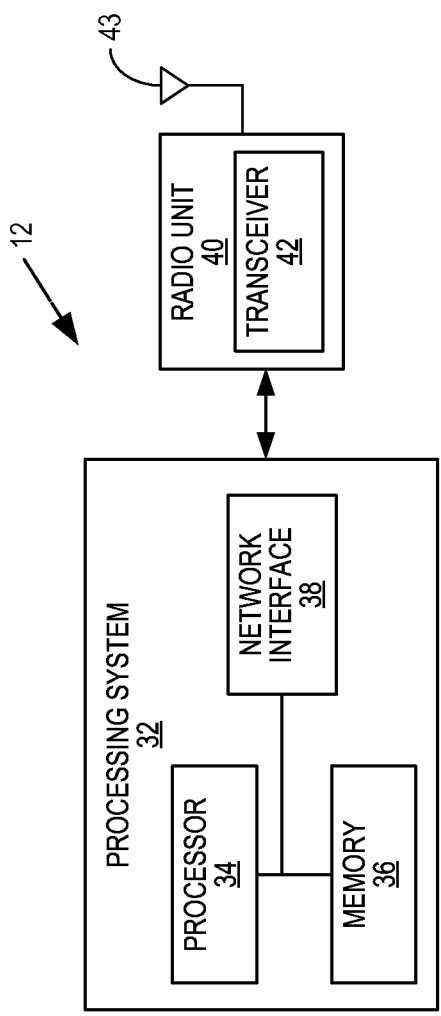
FIG. 19 is a block diagram of one embodiment of the base station of FIG. 5.

Although the illustrated base station 12 (or equivalently radio access node) may include any suitable hardware or combination of hardware and software, one embodiment of the base station 12 (or other radio access node) is illustrated in greater detail in FIG. 19. As shown in FIG. 19, the base station 12 includes a processing system 32 including a processor 34, memory 36, and a network interface 38 and a radio unit 40 including a transceiver 42 connected to one or more antennas 43. In particular embodiments, some or all of the functionality described above as being provided by the base station 12 may be provided by the processor 34 executing instructions stored on a computer-readable medium, such as the memory 36. Alternative embodiments of the base station 12 may include additional components responsible for providing additional functionality, including any of the functionality identified above and/or any functionality necessary to support the solution described above.

Figure 20:
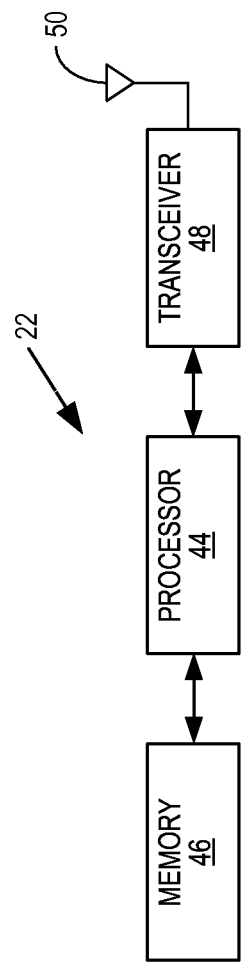
FIG. 20 is a block diagram of one embodiment of the Machine Type Communication (MTC) device of FIG. 5.

Likewise, although the illustrated MTC device 22 (and likewise the illustrated wireless device 20) may represent communication devices that include any suitable hardware or combination of hardware and software, these wireless communication devices may, in particular embodiments, represent devices such as the example embodiment of the MTC device 22 illustrated in FIG. 20. As shown in FIG. 20, the MTC device 22 includes a processor 44, memory 46, a transceiver 48, and an antenna 50. In particular embodiments, some or all of the functionality described above as being provided by the MTC device 22 may be provided by the processor 44 executing instructions stored on a computer-readable medium, such as the memory 46. Alternative embodiments of the MTC device 22 may include additional components beyond those shown in FIG. 20 that may be responsible for providing certain aspects of the MTC device's 22 functionality, including any of the functionality described above and/or any functionality necessary to support the solution described above.

The following acronyms are used throughout this disclosure.

3GPP 3$^{rd}$ Generation Partnership Project
CRS Common Reference Signal
CSI-RS Channel State Information Reference Signal
DC Direct Current
dB Decibel
DRX Discontinuous Reception
eNB Enhanced Node B
ESS Evolved/Enhanced Synchronization Signal
FDD Frequency Division Duplexing
Hz Hertz
ID Identity
LTE Long Term Evolution
M2M Machine-to-Machine
MHz Megahertz
ms Millisecond
MTC Machine Type Communication
OFDM Orthogonal Frequency Division Multiplexing
PCFICH Physical Control Format Indicator Channel
PDCCH Physical Downlink Control Channel
PHICH Physical Hybrid Automatic Repeat Request Indicator Channel
PSS Primary Synchronization Signal
RAN Radio Access Network
RB Resource Block
RE Resource Element
RSRP Reference Signal Received Power
RSRQ Reference Signal Received Quality
SID Study Item Description
SON Self Optimizing Network
SSS Secondary Synchronization Signal
TDD Time Division Duplexing
TR Technical Report
TS Technical Specification
UE User Equipment Those skilled in the art will recognize improvements and modifications to the preferred embodiments of the present disclosure. All such improvements and modifications are considered within the scope of the concepts disclosed herein and the claims that follow.

What is claimed is:

1. A method of operation of a base station of a cellular communications network, comprising:
    transmitting a synchronization signal comprising a plurality of repetitions of a basic synchronization block during a coherence time of a downlink channel over which the synchronization signal is transmitted, where the coherence time is defined as $T_c=1/f_d$, where $f_d$ is the Doppler frequency, which is defined as $f_d=v \cdot f/c$ where v is speed in m/s, f is carrier frequency in Hertz (Hz), and c is the speed of light.

2. The method of claim 1 wherein transmitting the synchronization signal comprises transmitting the synchronization signal according to a multi-subcarrier transmission scheme, and the basic synchronization block comprises a sequence of symbols transmitted over at least a subset of a plurality of subcarriers in a downlink bandwidth of the base station.

3. The method of claim 2 wherein the cellular communications network is a Long Term Evolution, LTE, cellular communications network, and the coherence time is one subframe.

4. The method of claim 2 wherein the cellular communications network is a Long Term Evolution, LTE, cellular communications network, and the coherence time is two subframes.

5. The method of claim 1 wherein the synchronization signal spans less than a full bandwidth of the downlink channel.

6. The method of claim 1 wherein the synchronization signal spans a full bandwidth of the downlink channel.

7. The method of claim 1 wherein transmitting the synchronization signal comprises transmitting the synchronization signal such that the plurality of repetitions of the basic synchronization block comprises a first instance of the basic synchronization block and a second instance of the basic synchronization block that immediately follows the first instance of the basic synchronization block in time.

8. The method of claim 1 wherein transmitting the synchronization signal comprises transmitting the synchronization signal such that the plurality of repetitions of the basic synchronization block comprises a first instance of the basic synchronization block and a second instance of the basic synchronization block that is separated from the first instance of the basic synchronization block in time.

9. The method of claim 1 further comprising transmitting a primary synchronization signal and a secondary synchronization signal in addition to the synchronization signal.

10. The method of claim 9 wherein:
    transmitting the primary synchronization signal and the secondary synchronization signal comprises transmitting the primary synchronization signal and the secondary synchronization signal at a first periodicity; and
    transmitting the synchronization signal comprises transmitting the synchronization signal at a second periodicity that is different than the first periodicity.

11. The method of claim 10 wherein the second periodicity is less than the first periodicity.

12. The method of claim 1 wherein transmitting the synchronization signal comprises block spreading the plurality of repetitions of the basic synchronization block.

13. The method of claim 12 wherein:
    transmitting the synchronization signal comprises transmitting the synchronization signal according to a multi-subcarrier signal based transmission scheme such that each repetition of the basic synchronization block of the plurality of repetitions is in a different multi-subcarrier signal symbol period; and
    block spreading the plurality of repetitions of the basic synchronization block comprises applying a different element from a block spreading sequence to each repetition of the basic synchronization block of the plurality of repetitions of the basic synchronization block.

14. The method of claim 13 wherein the block spreading sequence is different than that used in at least one other cell of the cellular communications network.

15. The method of claim 13 wherein the block spreading sequence is the same as that used in all other cells of the cellular communications network.

16. The method of claim 1 wherein the synchronization signal further comprises a second plurality of repetitions of a second basic synchronization block during a second coherence time of the downlink channel over which the synchronization signal is transmitted.

17. The method of claim 16 wherein the second basic synchronization block is different than the basic synchronization block.

18. The method of claim 16 wherein the second basic synchronization block is the same as the basic synchronization block.

19. The method of claim 16 wherein transmitting the synchronization signal comprises applying a block spreading sequence to the synchronization signal such that a first element from the block spreading sequence is applied to the plurality of repetitions of the basic synchronization block and a second element from the block spreading sequence is applied to the second plurality of repetitions of the second basic synchronization block.

20. The method of claim 16 wherein transmitting the synchronization signal comprises:
applying a first block spreading sequence to the synchronization signal such that a first element from the first block spreading sequence is applied to the plurality of repetitions of the basic synchronization block and a second element from the first block spreading sequence is applied to the second plurality of repetitions of the second basic synchronization block; and
applying a second block spreading sequence to the plurality of repetitions of the basic synchronization block such that a different element from the second block spreading sequence is applied to each repetition of the basic synchronization block in the plurality of repetitions of the basic synchronization block.

21. The method of claim 20 wherein transmitting the synchronization signal further comprises:
applying the second block spreading sequence to the second plurality of repetitions of the second basic synchronization block such that a different element from the second block spreading sequence is applied to each repetition of the second basic synchronization block in the second plurality of repetitions of the second basic synchronization block.

22. The method of claim 16 wherein the second coherence time immediately follows the coherence time in time.

23. The method of claim 16 wherein the coherence time and the second coherence time are separated in time.

24. The method of claim 16 wherein transmitting the synchronization signal comprises transmitting the synchronization signal according to a frequency-hopping scheme.

25. The method of claim 24 wherein transmitting the synchronization signal according to the frequency-hopping scheme comprises transmitting the synchronization signal such that the plurality of repetitions of the basic synchronization block during the coherence time are transmitted on a first set of sub-carrier frequencies and the second plurality of repetitions of the second basic synchronization block during the second coherence time are transmitted on a second set of sub-carrier frequencies that is at least partly different than the first set of sub-carrier frequencies.

26. The method of claim 1 wherein the synchronization signal further comprises a second part having a wider bandwidth than the plurality of repetitions of the basic synchronization block.

27. The method of claim 1 wherein transmitting the synchronization signal comprises puncturing the synchronization signal to transmit one or more other signals within time and frequency resources that would otherwise be used for the synchronization signal.

28. The method of claim 27 wherein the cellular communications network is a Long Term Evolution, LTE, cellular communications network, and the one or more other signals comprise one or more of a group consisting of: a control signal, a common reference signal, a channel state information reference signal, and an enhanced synchronization signal.

29. The method of claim 1 wherein transmitting the synchronization signal comprises transmitting the synchronization signal using time and frequency resources mapped around time and frequency resources used for one or more other signals.

30. The method of claim 29 wherein the cellular communications network is a Long Term Evolution, LTE, cellular communications network, and the one or more other signals comprise one or more of a group consisting of: a control signal, a common reference signal, a channel state information reference signal, and an enhanced synchronization signal.

31. The method of claim 1 wherein transmitting the synchronization signal comprises transmitting the synchronization signal using a power boosting scheme.

32. The method of claim 31 wherein the cellular communications network utilizes a multi-subcarrier transmission scheme, and transmitting the synchronization signal using the power boosting scheme comprises transmitting the synchronization signal while at least some of a plurality of subcarriers in a downlink bandwidth of the base station are unused or transmitted with reduced power.

33. The method of claim 1 wherein transmitting the synchronization signal comprises transmitting the synchronization signal using a beamforming transmission scheme.

34. The method of claim 33 wherein the beamforming transmission scheme is a blind beamforming transmission scheme.

35. A base station for a cellular communications network, comprising:
a transceiver; and
a processor associated with the transceiver and configured to transmit, via the transceiver, a synchronization signal comprising a plurality of repetitions of a basic synchronization block during a coherence time of a downlink channel over which the synchronization signal is transmitted, where the coherence time is defined as $T_c=1/f_d$, where $f_d$ is the Doppler frequency, which is defined as $f_d=v \cdot f/c$ where v is speed in m/s, f is carrier frequency in Hertz (Hz), and c is the speed of light.

36. The base station of claim 35 wherein the synchronization signal further comprises a second plurality of repetitions of a second basic synchronization block during a second coherence time of the downlink channel over which the synchronization signal is transmitted.

37. A method of operation of a wireless device in a cellular communications network, comprising:
detecting a synchronization signal in a downlink from a base station of the cellular communications network, the synchronization signal comprising a plurality of repetitions of a basic synchronization block during a coherence time of a downlink channel over which the synchronization signal is transmitted, where the coherence time is defined as $T_c=1/f_d$, where $f_d$ is the Doppler frequency, which is defined as $f_d=v \cdot f/c$ where v is speed in m/s, f is carrier frequency in Hertz (Hz), and c is the speed of light.

38. The method of claim 37 further comprising connecting to a cell served by the base station upon detecting the synchronization signal.

39. The method of claim 37 wherein the wireless device is a Machine Type Communication, MTC, device.

40. The method of claim 39 wherein the MTC device is located in an extended coverage area of a cell served by the base station.

41. The method of claim 37 wherein the basic synchronization block comprises a sequence of symbols transmitted over at least a subset of a plurality of subcarriers in a downlink bandwidth of the base station.

42. The method of claim 41 wherein the cellular communications network is a Long Term Evolution, LTE, cellular communications network, and the coherence time is one subframe.

43. The method of claim 41 wherein the cellular communications network is a Long Term Evolution, LTE, cellular communications network, and the coherence time is two subframes.

44. The method of claim 37 wherein the synchronization signal spans less than a full bandwidth of the downlink channel.

45. The method of claim 37 wherein the synchronization signal spans a full bandwidth of the downlink channel.

46. The method of claim 37 wherein the synchronization signal comprises a first instance of the basic synchronization block and a second instance of the basic synchronization block that immediately follows the first instance of the basic synchronization block in time.

47. The method of claim 37 wherein the synchronization signal comprises a first instance of the basic synchronization block and a second instance of the basic synchronization block that is separated from the first instance of the basic synchronization block in time.

48. The method of claim 37 further comprising detecting a primary synchronization signal and a secondary synchronization signal in addition to the synchronization signal.

49. The method of claim 37 wherein detecting the synchronization signal comprises detecting the synchronization signal according to a block spreading sequence applied to the plurality of repetitions of the basic synchronization block such that a different element from the block spreading sequence is applied to each repetition of the basic synchronization block in the plurality of repetitions of the basic synchronization block.

50. The method of claim 37 wherein the synchronization signal further comprises a second plurality of repetitions of a second basic synchronization block during a second coherence time of the downlink channel over which the synchronization signal is transmitted.

51. The method of claim 50 wherein detecting the synchronization signal comprises detecting the synchronization signal according to a block spreading sequence applied to the synchronization signal such that a first element from the block spreading sequence is applied to the plurality of repetitions of the basic synchronization block and a second element from the block spreading sequence is applied to the second plurality of repetitions of the second basic synchronization block.

52. The method of claim 50 wherein detecting the synchronization signal comprises detecting the synchronization signal according to:

a first block spreading sequence applied to the synchronization signal such that a first element from the first block spreading sequence is applied to the plurality of repetitions of the basic synchronization block and a second element from the first block spreading sequence is applied to the second plurality of repetitions of the second basic synchronization block; and a second block spreading sequence applied to the plurality of repetitions of the basic synchronization block such that a different element from the second block spreading sequence is applied to each repetition of the basic synchronization block in the plurality of repetitions of the basic synchronization block.

53. The method of claim 50 wherein detecting the synchronization signal comprises detecting the synchronization signal according to a frequency-hopping scheme utilized to transmit the synchronization signal.

54. The method of claim 37 wherein the synchronization signal further comprises a second part having a wider bandwidth than the plurality of repetitions of the basic synchronization block.

55. The method of claim 37 wherein detecting the synchronization signal comprises detecting the synchronization signal using time and frequency resources mapped around time and frequency resources used for one or more other signals.

56. The method of claim 55 wherein the cellular communications network is a Long Term Evolution, LTE, cellular communications network, and the one or more other signals comprise one or more of a group consisting of: a control signal, a common reference signal, a channel state information reference signal, and an enhanced synchronization signal.

57. The method of claim 37 further comprising, prior to detecting the synchronization signal:

detecting a primary synchronization signal and a secondary synchronization signal in the downlink from the base station;

wherein detecting the synchronization signal comprises, subsequent to detecting the primary synchronization signal and the secondary synchronization signal and after losing synchronization with the base station, detecting the synchronization signal but not at least one of the primary synchronization signal and the secondary synchronization signal such that synchronization with the base station is re-established.

58. A wireless device configured for operation in a cellular communications network, comprising:

a transceiver; and a processor associated with the transceiver and configured to detect, via the transceiver, a synchronization signal comprising a plurality of repetitions of a basic synchronization block during a coherence time of a downlink channel over which the synchronization signal is transmitted, where the coherence time is defined as $T_c=1/f_d$, where $f_d$ is the Doppler frequency, which is defined as $f_d=v \cdot f/c$ where v is speed in m/s, f is carrier frequency in Hertz (Hz), and c is the speed of light.

59. The wireless device of claim 58 wherein the synchronization signal further comprises a second plurality of repetitions of a second basic synchronization block during a second coherence time of the downlink channel over which the synchronization signal is transmitted.

* * * * *